(12) United States Patent
Ko et al.

(10) Patent No.: US 9,883,523 B2
(45) Date of Patent: Jan. 30, 2018

(54) METHOD FOR MANAGING WIRELESS RESOURCE AND APPARATUS THEREFOR

(71) Applicants: LG ELECTRONICS INC., Seoul (KR); KOREA ADVANCED INSTITUTE OF SCIENCE AND TECHNOLOGY, Daejeon (KR)

(72) Inventors: Hyunsoo Ko, Seoul (KR); Changsik Lee, Daejeon (KR); Jihwan Kim, Daejeon (KR); Jaehoon Chung, Seoul (KR); Song Chong, Daejeon (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 14/895,473

(22) PCT Filed: Feb. 12, 2014

(86) PCT No.: PCT/KR2014/001145
§ 371 (c)(1),
(2) Date: Dec. 2, 2015

(87) PCT Pub. No.: WO2014/196716
PCT Pub. Date: Dec. 11, 2014

(65) Prior Publication Data
US 2016/0119941 A1 Apr. 28, 2016

Related U.S. Application Data

(60) Provisional application No. 61/830,597, filed on Jun. 3, 2013.

(51) Int. Cl.
*H04W 40/00* (2009.01)
*H04W 72/12* (2009.01)
(Continued)

(52) U.S. Cl.
CPC ......... *H04W 72/121* (2013.01); *H04W 16/24* (2013.01); *H04W 24/02* (2013.01);
(Continued)

(58) Field of Classification Search
CPC ........... H04L 2001/0093; H04L 1/0003; H04L 1/0009; H04W 88/04; H04W 74/04;
(Continued)

(56) References Cited

U.S. PATENT DOCUMENTS

2002/0197999 A1* 12/2002 Wu .................... H04W 72/1252
455/452.1
2008/0274692 A1* 11/2008 Larsson ............. H04B 7/15592
455/24
(Continued)

FOREIGN PATENT DOCUMENTS

KR 1020100035088 4/2010
KR 1020120048863 5/2010
(Continued)

OTHER PUBLICATIONS

PCT International Application No. PCT/KR2014/001142, Written Opinion of the International Searching Authority dated Jun. 2, 2014, 17 pages.
(Continued)

*Primary Examiner* — Fred Casca
(74) *Attorney, Agent, or Firm* — Lee Hong Degerman Kang Waimey

(57) ABSTRACT

The present invention relates to a wireless communication system. More specifically, the present invention relates to a method for scheduling a terminal in a wireless communication system permitting overlapping between base station clusters, and an apparatus therefor, the method comprising the steps of: grouping a plurality of terminals into a plurality of groups satisfying predetermined conditions; and selecting
(Continued)

(a) Feasible UE selection (b) Infeasible UE selection one more terminals for scheduling by means of a group-based greedy algorithm for each of the plurality of groups, wherein, in the group-based greedy algorithm, a check is skipped for whether the total number of base station antennas corresponding to each group is equal to or greater than the number of terminals selected from each group.

18 Claims, 23 Drawing Sheets

(51) Int. Cl.
| | |
|---|---|
| H04W 88/08 | (2009.01) |
| H04W 24/02 | (2009.01) |
| H04W 72/04 | (2009.01) |
| H04W 16/24 | (2009.01) |
| H04W 52/04 | (2009.01) |
| H04W 28/08 | (2009.01) |

(52) U.S. Cl.
CPC ........... *H04W 28/08* (2013.01); *H04W 52/04* (2013.01); *H04W 72/04* (2013.01); *H04W 88/08* (2013.01)

(58) Field of Classification Search
CPC ... H04W 36/32; H04W 72/04; H04W 88/085; H04W 88/08; H04W 24/02; H04W 84/045; H04W 88/02; H04W 24/10; H04W 16/08; H04W 16/18; H04W 16/32; H04W 28/06; H04W 28/08; H04W 28/16; H04W 28/18; H04W 52/0206; H04H 72/121
USPC ....... 455/453, 426.1, 67.11, 446, 450, 452.1, 455/447, 561, 522, 524, 509, 62; 370/328, 349, 329, 252, 254, 338, 203, 370/235, 281, 330, 332
See application file for complete search history.

(56) References Cited

U.S. PATENT DOCUMENTS

| | | | |
|---|---|---|---|
| 2010/0169446 A1 | 7/2010 | Linden et al. | |
| 2010/0246498 A1* | 9/2010 | Lim .................... | H04L 5/0007 370/329 |
| 2011/0249605 A1* | 10/2011 | Kwon .............. | H04W 52/0229 370/311 |
| 2012/0269104 A1* | 10/2012 | Zhang .................. | H04W 8/005 370/280 |
| 2013/0023302 A1* | 1/2013 | Sivanesan ............ | H04W 36/32 455/525 |
| 2013/0155970 A1* | 6/2013 | Tulino .............. | H04W 72/1273 370/329 |

FOREIGN PATENT DOCUMENTS

| | | |
|---|---|---|
| KR | 10-2010-0062368 | 6/2010 |
| KR | 10-2010-0079215 | 7/2010 |
| KR | 1020110006821 | 1/2011 |
| KR | 1020110044908 | 5/2011 |
| WO | 2010013950 | 2/2010 |
| WO | 2011132908 | 10/2011 |
| WO | 2012/002722 | 1/2012 |
| WO | 2012/030037 | 3/2012 |
| WO | 2012030037 | 3/2012 |
| WO | 2013025051 | 2/2013 |

OTHER PUBLICATIONS

PCT International Application No. PCT/KR2011/001141, Written Opinion of the International Searching Authority dated Jun. 2, 2014, 17 pages.
Suk Ho Shin, et al., "Closed-form Expressions for Optimal Transmission Power Achieving Weighted Sum-Rate Maximization in MIMO Systems", Jul. 2010, 9 pages.
PCT International Application No. PCT/KR2014/001145, Written Opinion of the International Searching Authority dated Jun. 2, 2014, 15 pages.

\* cited by examiner

FIG. 6
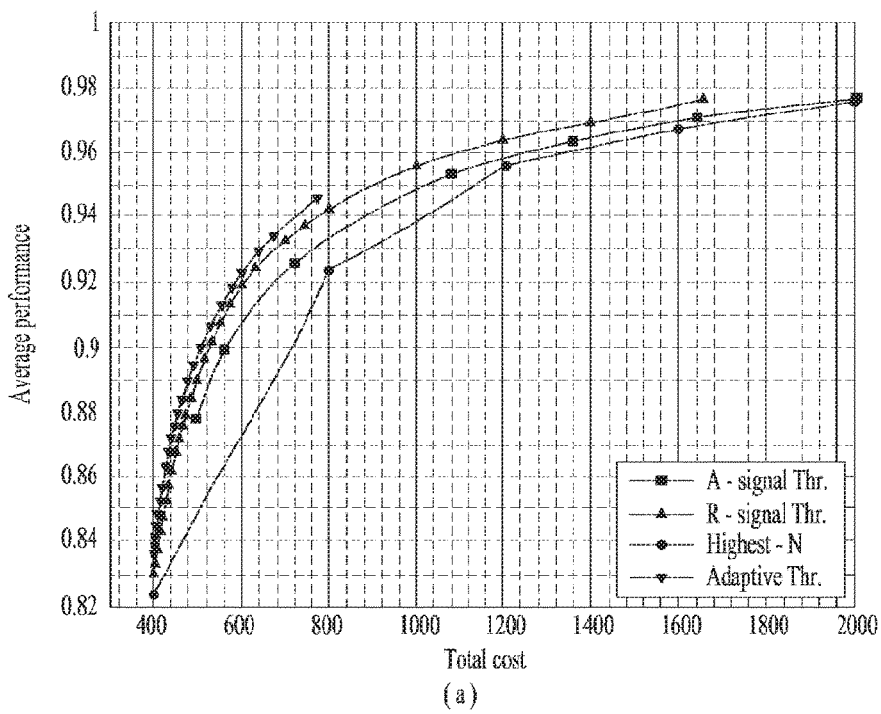
(a)
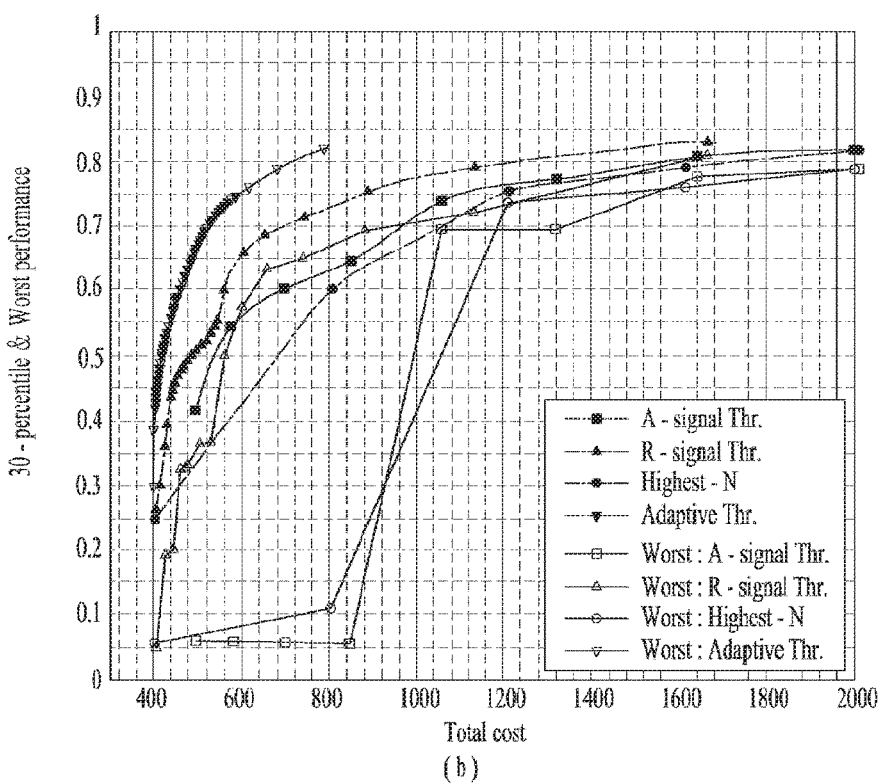
(b)

FIG. 7
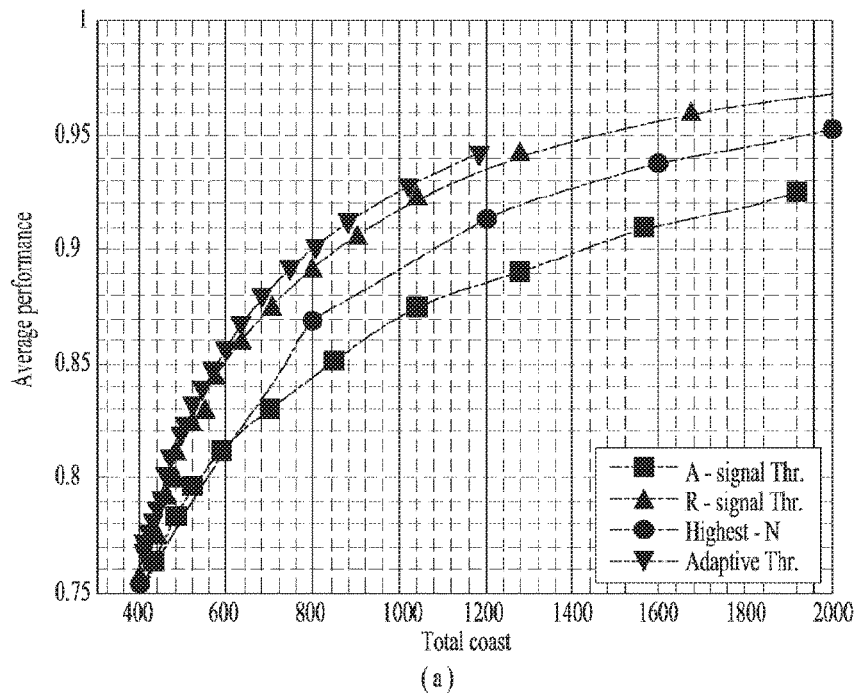
(a)
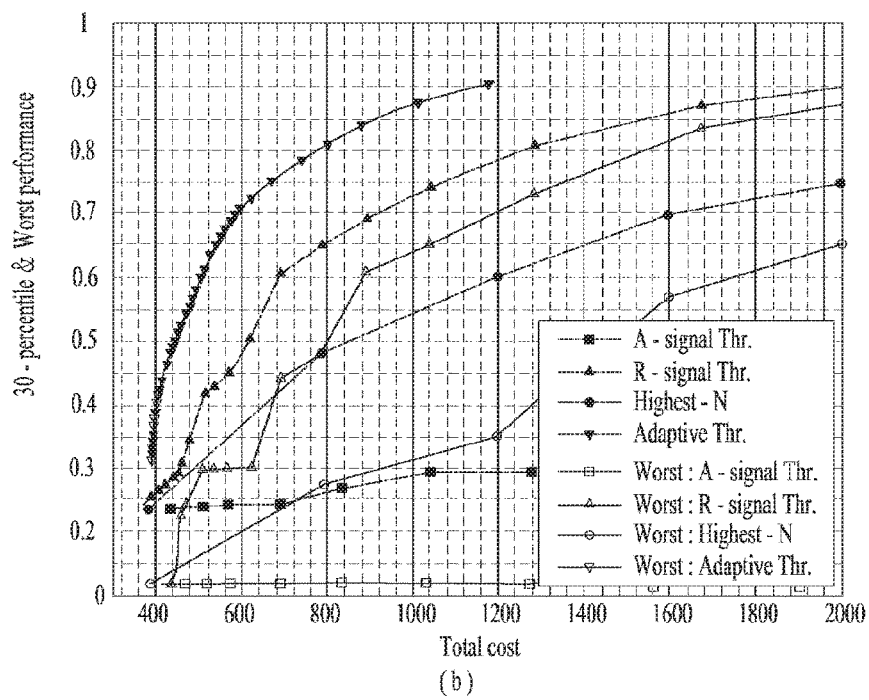
(b)

(a) Feasible UE selection	(b) Infeasible UE selection

FIG. 11

| MS ID | Cluster BS ID | Load (A, B, C) | Group ID |
|-------|---------------|----------------|----------|
| 1 | A, B, C | (0, 0, 0) | A |
| 2 | A, B | (1, 0, 0) | B |
| 3 | A | (1, 1, 0) | A |
| 4 | B, C | (2, 1, 0) | C |
| 5 | A, B, C | (2, 1, 1) | B |
| ... | ... | ... | ... |

FIG. 12

Greedy scheduling

1. Set $S = \emptyset$
2. While $|S| < \Sigma_{m \in M} N_{T,m}$ do
3.     Set val = 0
4.     For all $k \in K / S$ do
5.         If isFeasible ( $S \cup \{k\}$ ) then
6.             If ExpRate ( $S \cup \{k\}$ ) > val then
7.                 $S' = S \cup \{k\}$
8.                 val = ExpRate ( $S \cup \{k\}$ )
9.             Endif
10.         Endif
11.     Endfor
12.     If ExpRate ( $S$ ) $\geq$ ExpRate ( $S'$ ) then
13.         break
14.     Endif
15.     Set $S = S'$
16. Endwhile

FIG. 13

Group based Greedy scheduling ( for each group m )

1. Set $S_m = \emptyset$
2. While $|S_m| < N_{T,m}$ do
3.     Set val = 0
4.     For $\forall k \in K_m / S_m$ do
5.         If ExpRate ( $S_m \cup \{k\}$ ) > val then
6.             $S'_m = S_m \cup \{k\}$
7.             val = ExpRate ( $S_m \cup \{k\}$ )
8.         Endif
9.     Endfor
10.     If ExpRate ( $S_m$ ) $\geq$ ExpRate ( $S'_m$ ) then
11.         break
12.     Endif
13.     Set $S_m = S'_m$
14. Endwhile FIG. 17
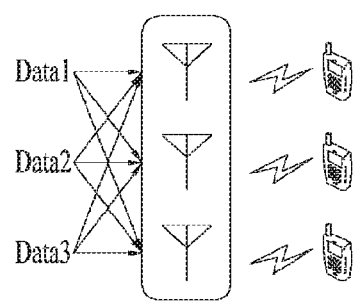
(a) Single - cell MU - MIMO
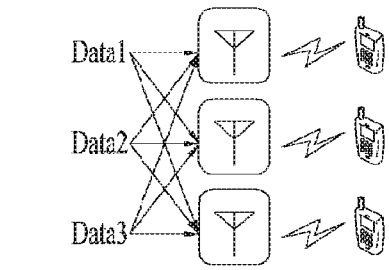
(b) multi - cell transmission
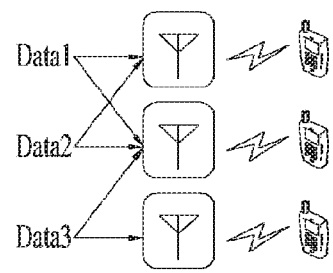
(c) multi - cell transmission with overlapped clusters

FIG. 19

Precoding algorithm
    1. For each MS $k \in s$
    2.     Construct $A_k, B_k$
    3.     Set $\lambda_k = \bar{v}_k^* (A_k - B_k) \bar{v}_k$
    4.     Repeat
    5.         $u_k = (A_k - B_k - (\lambda_k + \beta) I)^{-1} \bar{v}_k$
    6.         $\bar{v}_k = \frac{u_k}{\|u_k\|}$
    7.         $\lambda_k = [\bar{v}_k^* (A_k - B_k) \bar{v}_k]^+$
    8.     Until $\|(A_k - B_k) \bar{v}_k - \lambda_k \bar{v}_k\| < \delta$ or max # of iterations
    9.     If $\lambda_k = 0$, then $\bar{v}_k = 0$
    10. Endfor FIG. 20
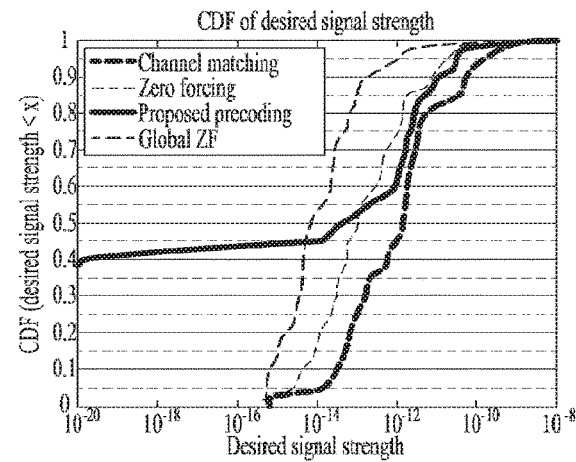
(a) CDF of signal component received by UE of network
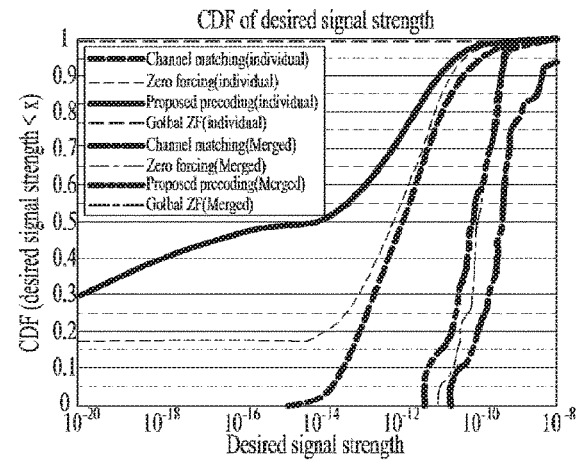
(b) CDF of interference component received by UE of network
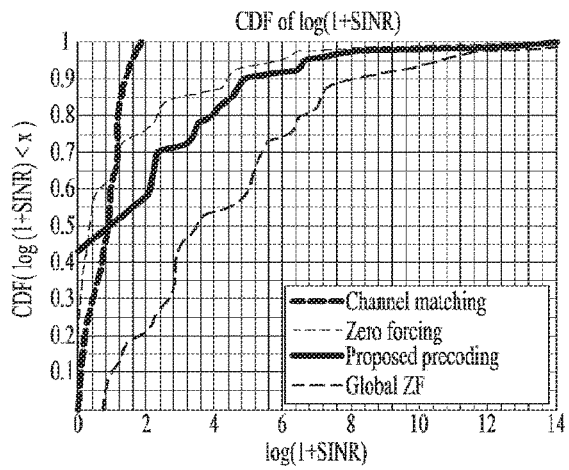
(c) CDF of log(1+SINR) per UE of network FIG. 21
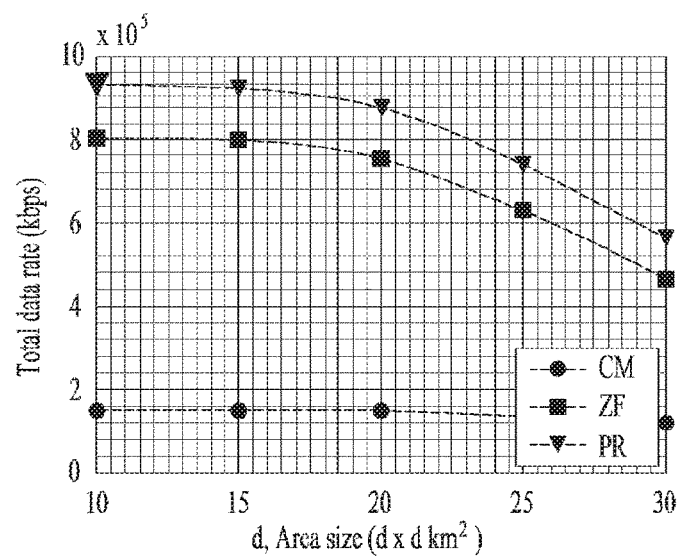
(a) Single cell transmission environment
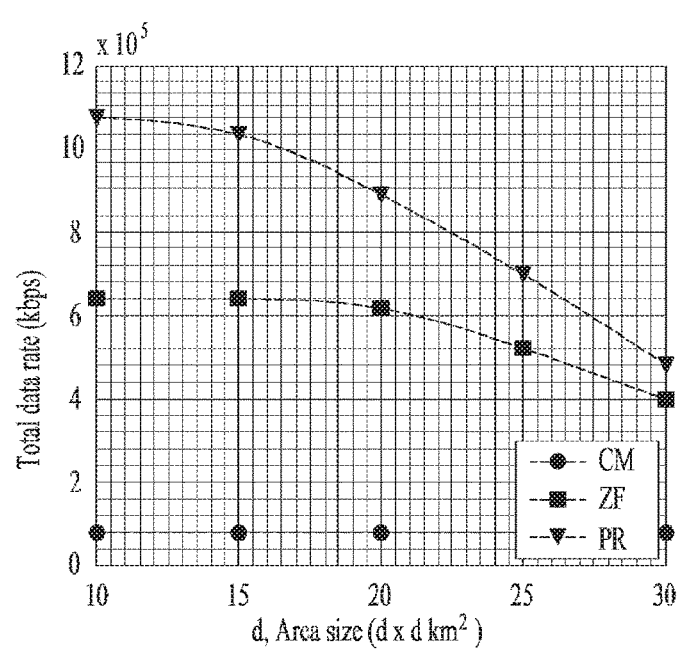
(b) Base station cooperative communication environment; cluster size = 2

FIG. 22

Water - Filling based power allocation algorithm

1. Construct $tax_n$, $height_n$, for all subcarrier n
2. Set $\mu = \frac{\mu^{max}}{2}$, $[a, b] = [0, \mu^{max}]$
3. Repeat
4. $P_n = [\frac{1}{tax_n + \mu} - height_n]^+$, for all subcarrier n
5. $\mu = \frac{a+b}{2}$
6. If $\sum_n P_n >$ power budget then $a = \mu$
7. If $\sum_n P_n <$ power budget then $b = \mu$
8. Until P converges

FIG. 23

Cluster - level Water - Filling (CWF) based Power allocation algorithm

1. Construct $tax_k$, $height_k$, $\forall k \in S$
2. Set $\mu_m = \frac{\mu^{max}}{2}$, $[a_m, b_m] = [0, \mu^{max}]$ $\forall m$
3. Repeat
4. $P_k = [\frac{w_k}{tax_k + \sum_{m \subset M_k} ||v_{mk}||^2 \mu_m} - height_k]^+$, $\forall k \in S$
5. $\mu_m = \frac{a_m + b_m}{2}$, $\forall m$
6. If $\sum_{k \in K_m \cap s} ||v_{mk}||^2 P_k > \overline{P}_m$ then $a_m = \mu_m$, $\forall m$
7. If $\sum_{k \in K_m \cap s} ||v_{mk}||^2 P_k < \overline{P}_m$ then $b_m = \mu_m$, $\forall m$
8. Until $\overline{P}_m - \sum_{k \in K_m \cap s} ||v_{mk}||^2 P_k < \delta$ or $\sum_m \mu_m < \delta$ FIG. 24
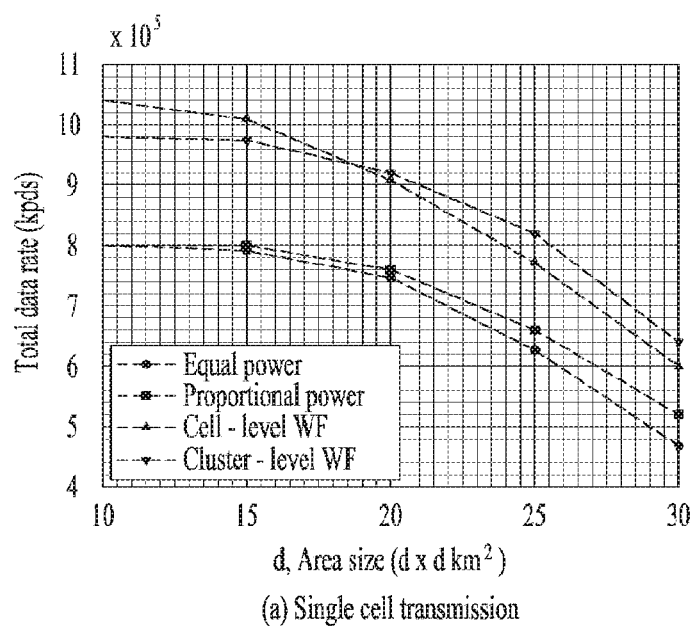
(a) Single cell transmission
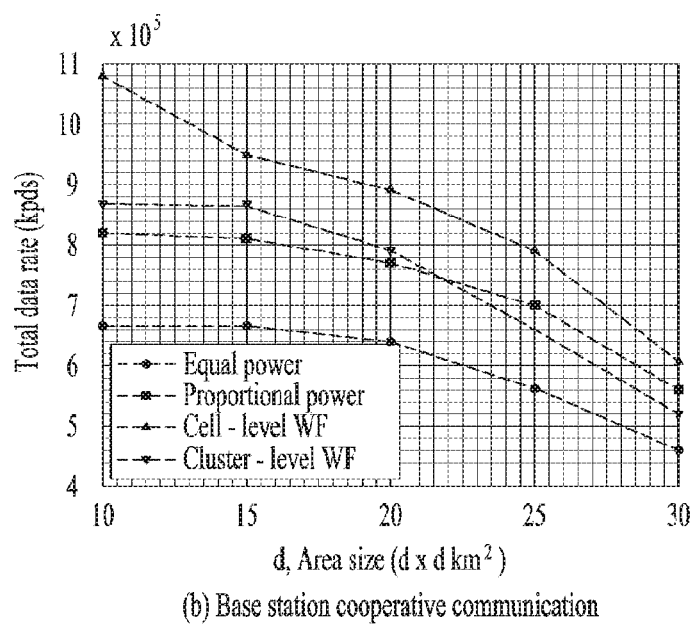
(b) Base station cooperative communication FIG. 25
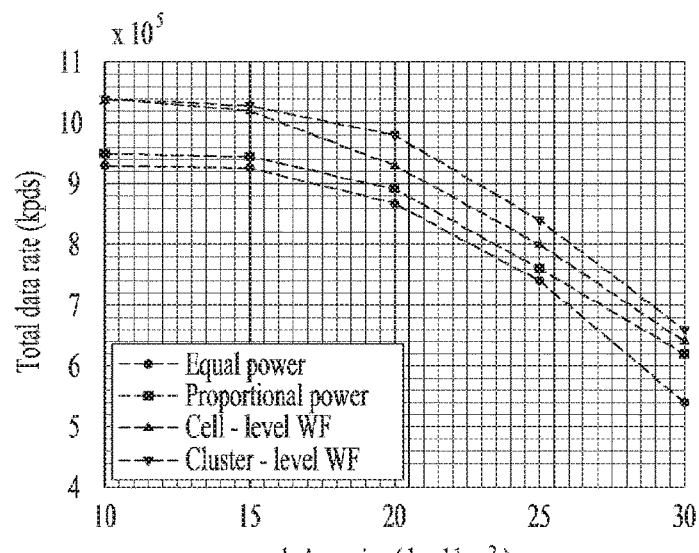
(a) Single cell transmission
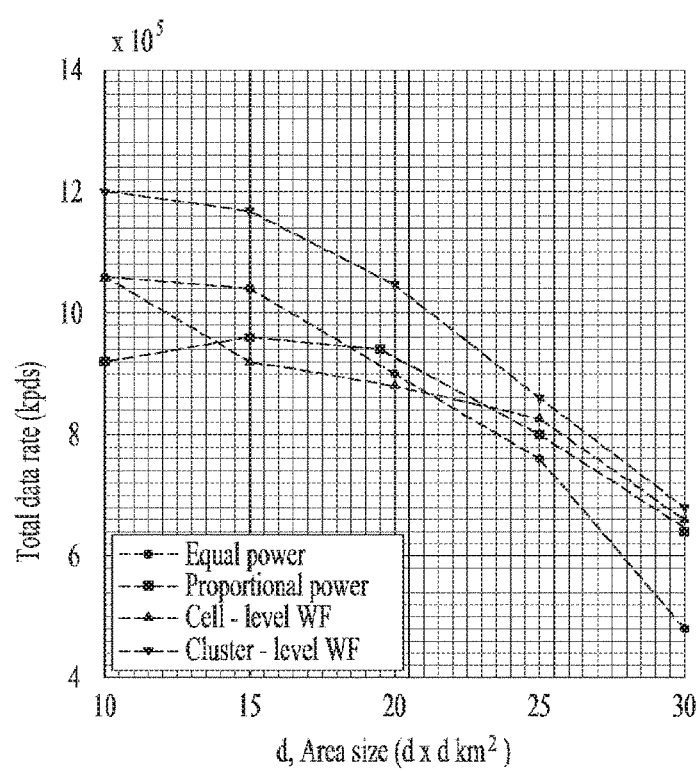
(b) Base station cooperative communication 1. For each MS k ∈ K
2.   Find $M_k$ by clustering algorithm (See Table 1)
3. Endfor
4. For each timeslot
5.   Find S by scheduling algoritm (See FIG. 13)
6.   For each MS k ∈ S
7.     Precoder $\bar{v}_k$ & Power $P_k$ initialization
8.   Endfor
9.   Repeat
10.     Find v by precoding algorithm (See FIG. 19)
11.     Find p power allacation algorithm (See FIG. 23)
12.  Until v & p converge or max # of iterations
13. Endfor

METHOD FOR MANAGING WIRELESS RESOURCE AND APPARATUS THEREFOR

CROSS-REFERENCE TO RELATED APPLICATIONS

This application is the National Stage filing under 35 U.S.C. 371 of International Application No. PCT/KR2014/001145, filed on Feb. 12, 2014, which claims the benefit of U.S. Provisional Application No. 61/830,597, filed on Jun. 3, 2013, the contents of which are all hereby incorporated by reference herein in their entirety.

TECHNICAL FIELD

The present invention relates to a wireless communication system. More specifically, the present invention relates to a method and apparatus for efficient radio resource management (RRM) in a radio access network (RAN) environment.

BACKGROUND ART

The amount of data communication in the present wireless communication is exponentially increasing due to prevalence of various mobile equipments such as smart phones. It is expected that the amount of data communication will increase hundred times more than now in a few years. Thus, the current LTE system could not accommodate the requirements of data usage amount. To address such problems, more and more base stations can be constructed additionally, but it may require enormous expenditures, and frequency resources are too restrictive. Thus, it is necessary to develop a next generation technology for wireless communication and access network that can efficiently accommodate enhanced network capacity and traffic variations in time and space and also can reduce network operating expenditure (OPEX) and capital expenditure (CAPEX).

DISCLOSURE OF THE INVENTION

Technical Tasks

An object of the present invention is to provide a method of efficiently performing a radio resource management (RRM) in wireless access network (RAN) environment and an apparatus therefor.

Another object of the present invention is to provide a method of efficiently performing a radio resource management (RRM) in multi-tier/small cell RAN environment and an apparatus therefor.

Another object of the present invention is to provide a method of forming a cluster for cost-efficient base station cooperative communication and an apparatus therefor.

Another object of the present invention is to provide a method of performing scheduling of a low complexity in consideration of feasibility and efficiency in a situation of performing base station cooperative communication and an apparatus therefor.

The other object of the present invention is to provide a method of performing precoding applicable to a situation of base station cooperative communication in which an overlap is permitted and/or a method of allocating power and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

In an aspect of the present invention, provided herein is a method of scheduling a user equipment by a network in a wireless communication system in which an overlap is permitted between base station clusters, the method comprising: grouping a plurality of user equipments into a plurality of groups to satisfy a specific condition; and selecting at least one user equipment from each of the plurality of groups for scheduling using a group-based greedy algorithm, wherein checking whether or not a total number of antennas of a base station corresponding to each group is equal to or greater than a number of user equipments selected from each group is skipped in the group-based greedy algorithm.

In another aspect of the present invention, provided herein is a communication device configured to schedule a user equipment in a wireless communication system in which an overlap is permitted between base station clusters, the communication device comprising: a radio frequency (RF) unit: and a processor configured to group a plurality of user equipments into a plurality of groups to satisfy a specific condition, and select at least one or more user equipments from each of the plurality of the groups for scheduling using a group-based greedy algorithm, wherein checking whether or not a total number of antennas of a base station corresponding to each group is equal to or greater than a number of user equipments selected from each group is skipped in the group-based greedy algorithm.

Preferably, the specific condition comprises a condition that each group contains one or more corresponding base stations and each base station corresponds to a single group only, and a condition that each user equipment belongs to a single group only and the group contains a single base station among cluster base stations of the corresponding user equipment.

Preferably, the grouping sequentially maps each user equipment from a group having lowest load.

Preferably, the group-based greedy algorithm includes for each group and each user equipment belonging to a corresponding group: comparing performance expected when a corresponding user equipment is included in the at least one or more user equipments with performance expected when the corresponding user equipment is not included in the at least one or more user equipments, and including the corresponding user equipment in the at least one or more user equipments when the performance expected when a corresponding user equipment is included in the at least one or more user equipments is better than the performance expected when the corresponding user equipment is not included in the at least one or more user equipments.

More preferably, the comparing and the including are repeated in the group-based greedy algorithm, until a number of the at least one or more user equipments becomes equal to or greater than the total number of antennas of a base station corresponding to a group or no performance enhancement is expected for the at least one or more user equipments.

Advantageous Effects

According to the present invention, it is able to efficiently perform a radio resource management (RRM) in wireless access network (RAN) environment.

According to the present invention, it is able to efficiently perform a radio resource management (RRM) in multi-tier/small cell RAN environment.

According to the present invention, it is able to efficiently form a cluster for cost-efficient base station cooperative communication.

According to the present invention, it is able to perform scheduling of a low complexity in consideration of feasibility and efficiency in a situation of performing base station cooperative communication.

According to the present invention, it is able to efficiently perform precoding applicable to a situation of base station cooperative communication in which an overlap is permitted and/or power allocation.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention, illustrate embodiments of the invention and together with the description serve to explain the principle of the invention.

FIG. 6 and FIG. 7 are diagrams for examples of comparing performance of a base station clustering method according to the present invention with performance of legacy clustering methods.

FIG. 11 shows an example of least loaded group mapping according to the present invention.

FIG. 12 shows an example of a greedy scheduling method in base station cooperative communication environment in which a cluster overlapping is permitted.

FIG. 13 shows an example of a group-based greedy UE scheduling method in base station cooperative communication environment in which a cluster overlapping is permitted according to the present invention.

FIG. 17 shows an example of precoding in various MIMO environments.

FIG. 19 shows an example of a method of finding out a precoder according to the present invention.

FIG. 20 shows an example of comparing performance of a precoder according to the present invention and performance of a different precoding scheme with each other.

FIG. 21 shows an example for performance of a precoder in a situation that a network size is changing.

FIG. 22 shows an example of a water filling-based power allocation algorithm.

FIG. 23 shows an example of a power allocation method according to the present invention.

FIG. 24 and FIG. 25 show an example of comparing performance of a power allocation method according to the present invention and performance of a different power allocation method with each other.

MODE FOR INVENTION

The present invention relates to a wireless communication system. More specifically, the present invention relates to a method of efficiently performing radio resource management (RRM) in a multi-tier cell and/or a small cell radio access network (RAN) and an apparatus therefor.

Figure 1:
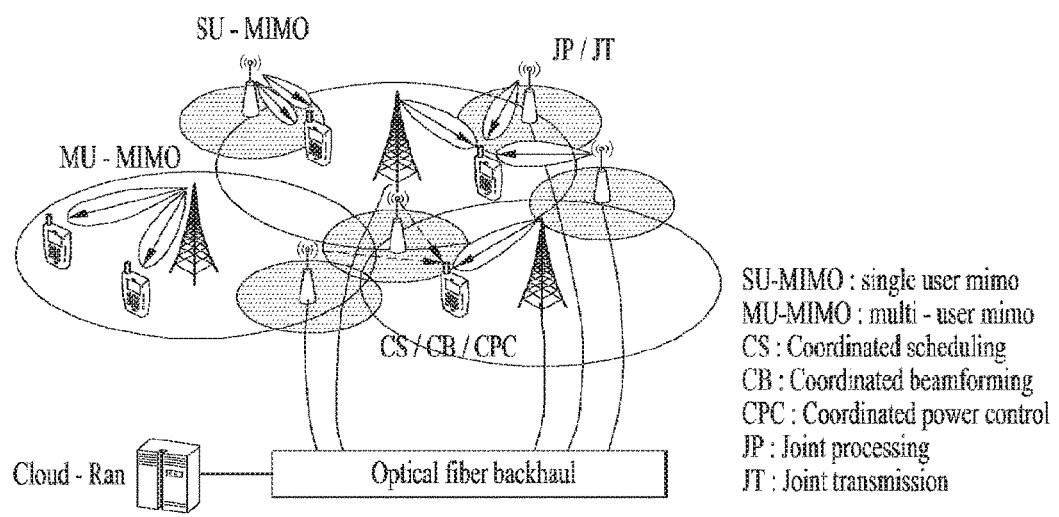
FIG. 1 shows an example of cooperative or coordinated wireless communication environment.

FIG. 1 shows an example of cooperative or coordinated wireless communication environment.

Referring to FIG. 1, in order to secure more radio capacity via spatial reuse of a spectrum or solve a radio shadow area, a lot more small cells (e.g., a pico cell, a femto cell) can be used in a manner of being overlapped with a macro cell in cooperative wireless communication environment. A cooperative multi-point or coordinated multi-point (CoMP) system can be configured via the overlap of the cells. A scheme used in the CoMP system can include a joint processing (JP)/a joint transmission (JT) scheme, a cooperative or coordinated scheduling (CS)/cooperative or coordinated beamforming (CB) scheme/a cooperative or coordinated power control (CPC) scheme.

The JP/JR scheme corresponds to a scheme that downlink signals, which are transmitted to a user equipment from a base station, are transmitted from a plurality of points (all or a part of points (e.g., base station) participating in a CoMP operation) at a time. In particular, data transmitted to a single user equipment can be transmitted from a plurality of transmission points at the same time. According to the JP/JR scheme, quality of a reception signal can be coherently or non-coherently enhanced and interference for a different user equipment can be actively eliminated. According to the CS/CB/CPC scheme, points participating in a CoMP operation can cooperatively perform beamforming of data transmission for a single user equipment. In this case, although the data is transmitted from a serving point, user scheduling/beamforming/power control can be determined by cooperation of the points participating in the CoMP operation.

And, it may use a MIMO (multiple input multiple output) antenna scheme using multiple antennas in the CoMP system. For example, the MIMO scheme can include single user MIMO (SU-MIMO) corresponding to a scheme of allocating both an antenna resource of a base station and a radio resource to a single user and multi user MIMO (MU-MIMO) corresponding to a scheme of distributing an antenna resource or a radio resource to a plurality of users.

As mentioned in the foregoing description, the CoMP system may correspond to a system operating as a virtual MIMO system in a manner of binding a plurality of transmission points into a single group or a system of a single transmission point operating as a MIMO system. Hence, it is able to apply a communication scheme of a MIMO system using multiple antennas.

Meanwhile, a high density RAN structure of which small cells are arranged with high density may cause such a problem as interference between neighboring/overlapped cells (not only inter-cell interference of a same tier but also inter-cell interference of a different tier). This sort of interference problem may reduce a gain capable of being obtained via a small cell. According to a legacy system, in order to solve the interference problem between neighboring/overlapped cells, static frequency reuse pattern allocation and transmission scheduling of a primitive level are used. Yet, since a topology of small cell environment can be very dynamically changed compared to legacy macro cell-based wireless environment and it is necessary to use a more evolved physical layer technology, it is required to have an adaptive and advanced RRM scheme. To this end, a discussion on a cloud radio access network (Cloud-RAN), which may correspond to the adaptive and advanced RRM scheme, is in progress.

Figure 2:
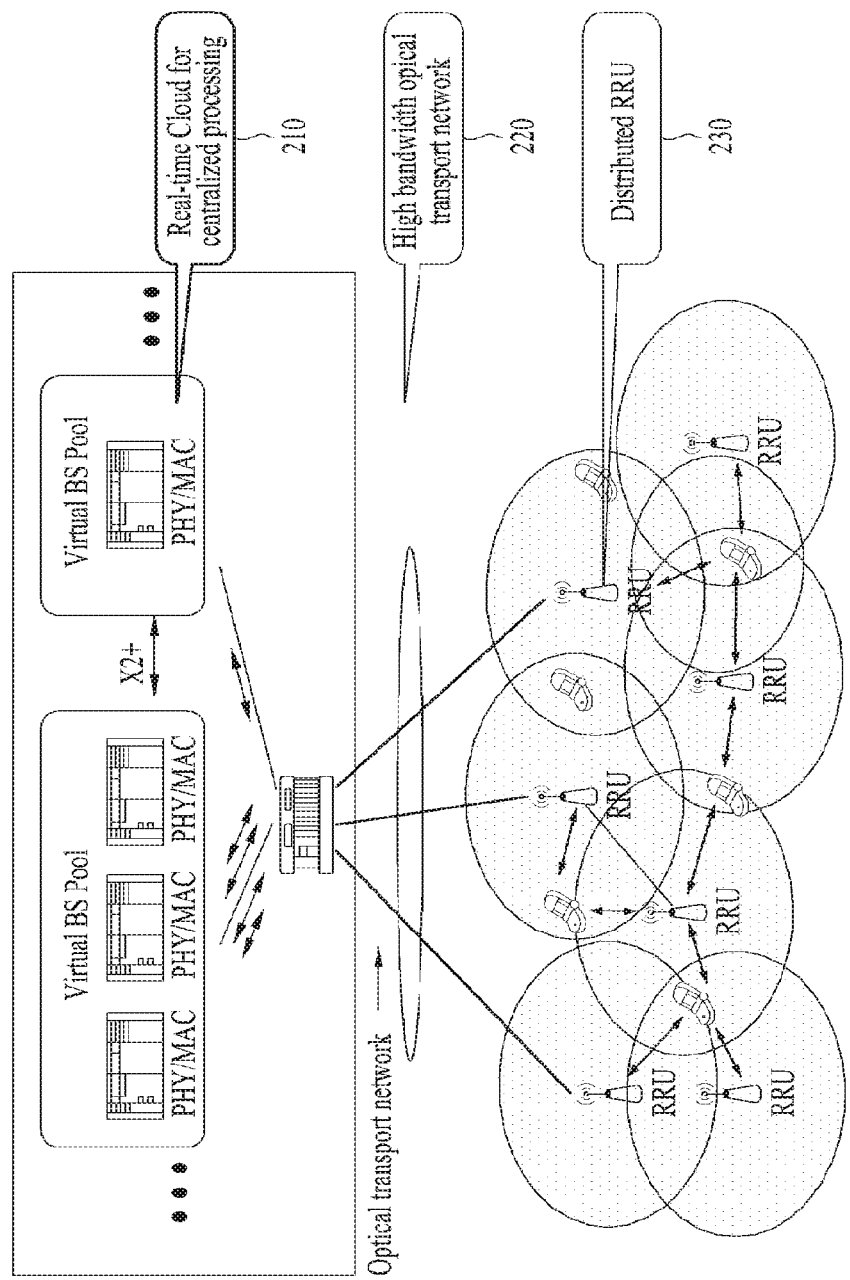
FIG. 2 shows an example for a cloud RAN system.

FIG. 2 shows an example for a cloud RAN system.

A cloud RAN (or C-RAN) system corresponds to one of future network systems proposed to overcome a cost limit on additionally installing base stations in accordance with increasing traffic requirements of users and a limit on a limitative frequency resource. A current mobile communication network management scheme corresponds to a distributive system configured to process a requirement of a user in a manner that all base station maximally utilize a resource allocated to each of the base stations. On the contrary, the cloud RAN system corresponds to a centralized system of a cloud computing concept configured to centrally process a requirement of a user in a manner that base stations are connected with each other via a backhaul. Since the cloud RAN system performs resource management in a manner of centrally processing a service used to be performed in each layer (e.g., PHY/MAC) of a legacy base station, it is able not only to solve a cost problem according to an additional base station but also to easily implement cooperative communication between base stations for cell capability enhancement. Hence, efficiency of a radio resource can be maximized via the cloud RAN system.

Referring to FIG. 2, the cloud RAN system can include a real-time cloud server 210, a backhaul network 220, and a remote radio unit (RRU) 230. The cloud server 210 can provide real-time cloud computing for centralized processing. The backhaul network 220 connects the RRU 230 and the cloud server 210 with each other and provides a high bandwidth to enable high capacity information to be delivered with fast speed. As an example, the backhaul network 220 can be implemented by an optical transport network. The RRU 230 can provide the aforementioned CoMP communication scheme to user equipments. Although FIG. 2 shows an example that the cloud server 210 implements PHY/MAC layer, by which the present invention may be non-limited. For example, a PHY layer is implemented in the RRU 230 and a MAC layer and higher can be implemented in the cloud server 210.

Figure 3:
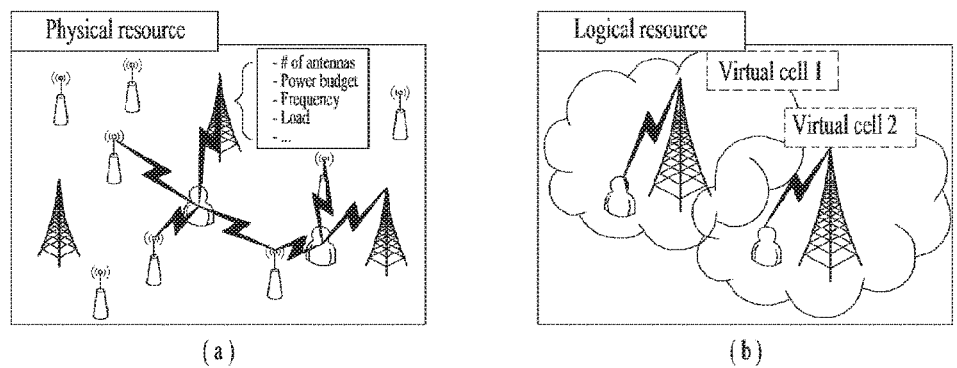
FIG. 3 shows an example of a cell concept of a legacy system and an example of a virtual cell concept of a cloud RAN system.

FIG. 3 shows an example of a cell concept of a legacy system and an example of a virtual cell concept of a cloud RAN system. There is a difference between the legacy system and the cloud RAN system in a main entity performing RRM. The legacy system is managed in a manner that a base station makes user equipments belonging to a cell schedule/allocate a radio resource, whereas radio resource management (RRM) can be performed via cloud in the cloud RAN system. For example, in the cloud RAN system, there is no resource allocation restriction on a user equipment because a user equipment belongs to a specific base station. A user equipment can freely receive resource allocation via a plurality of base stations. Hence, unlike a conventional cell comprehended as a concept of service coverage of a base station in the legacy system, it may be able to introduce a concept of a virtual cell, which is formed on the basis of a user equipment on a cloud server, in the cloud RAN system.

FIG. 3 (a) shows an example of performing RRM via a base station in a legacy system. As shown in the example of FIG. 3 (a), each base station installed in a space may correspond to a physical resource of a network in the legacy system and each base station can specify the resource by a power budget, a frequency band, the number of antennas, load and the like. Yet, in the aspect of a user equipment, if a same QoS (quality of service)/QoE (quality of experience) is provided and a same cost (or a same condition) is required, whether communication is performed with a macro cell or a small cell (e.g., a femto cell or a pico cell) or whether communication is performed with a plurality of cells at the same time is not important for the user equipment. Hence, in terms of a user equipment, it may be preferable to configure a virtual cell in a manner of collecting physical base stations best suited to the user equipment.

FIG. 3 (b) shows an example of performing RRM in a cloud system. Unlike the legacy system, a user equipment can select a physical base station best suited to communication environment of the user equipment in the cloud system and may be able to form a virtual cell via cloud based on the selected base station. In the example of FIG. 3 (b), although it is depicted as each virtual cell (e.g., a virtual cell 1, a virtual cell 2) is formed on the basis of a base station, the base station shown in FIG. 3 (b) corresponds to a virtual base station and each virtual cell can include one or more physical base stations. Hence, it is able to overcome demerits, which are capable of being occurred in the aspect of a user located at a cell edge in managing a resource on the basis of a legacy base station, using a virtual cell.

As mentioned in the foregoing description, since a virtual cell is formed to be best suited to each user equipment in the cloud RAN system, each user equipment can determine a base station cluster to form a virtual cell. Base station clustering may indicate to select a physical base station set selected by a user equipment to form a virtual cell and the physical base station set can be called a base station cluster. Since overall system performance of the cloud RAN system can be influenced according to how a base station cluster is formed by each user equipment, it may be preferable for each user equipment to form the base station cluster in a manner of minimizing cost for the base station cluster.

And, each of physical base stations belonging to the base station cluster can be overlapped with a plurality of base station clusters (or virtual cells). In this case, it is necessary to schedule user equipments corresponding to a plurality of the base station clusters to maximize transmission capability. And, in order to provide optimized transmission environment to a scheduled user equipment, it may be preferable to apply a precoding scheme and perform power control.

Hence, the present invention proposes various efficient schemes necessary for managing a virtual cell. More specifically, the present invention proposes a base station clustering scheme for forming a UE-centered virtual cell, a scheduling scheme capable of maximizing the total transfer rate in multi-virtual cell environment in which an overlap is permitted and a precoding and power control scheme for providing optimized transmission environment to a scheduled user equipment.

Base Station Clustering

As mentioned in the foregoing description, as a method of enhancing network capability and controlling inter-cell interference, it may use a CoMP system. In the CoMP system, a plurality of base stations are connected with each other via a backhaul and may be able to transceive data with a single user equipment at the same time. Hence, since a previously interfering cell may help in transmitting a signal and interference is eliminated in the CoMP system, it is able to enhance data transfer rate.

In case of using a base station cooperative scheme (or CoMP scheme), it may be preferable to perfectly eliminate inter-cell interference in a manner that all base stations existing in a network cooperate with each other (full cooperation) and configure a huge virtual MIMO system. Yet, although the full cooperation can secure highest performance, the full cooperation also accompanies demerits. First of all, for the full cooperation, it is necessary for all base stations to have data to be transmitted to a user equipment. If a size of a network size increases and the number of user equipments increase, this may act as very significant amount of load to a backhaul. Moreover, it is necessary to measure channel information between all user equipments and all base stations and feedback the channel information to the network. And, it is also necessary to share the channel information by all base stations. Hence, in case of performing the full cooperation, very significant amount of overhead may occur in both wired and wireless.

In order to overcome the demerits of the full cooperation, it may be more realistic to form a base station cluster by cooperation of a part of base stations instead of all base stations in a network. In this case, since it is able to control inter-cell interference belonging to a same cluster, performance can be improved.

Figure 4:
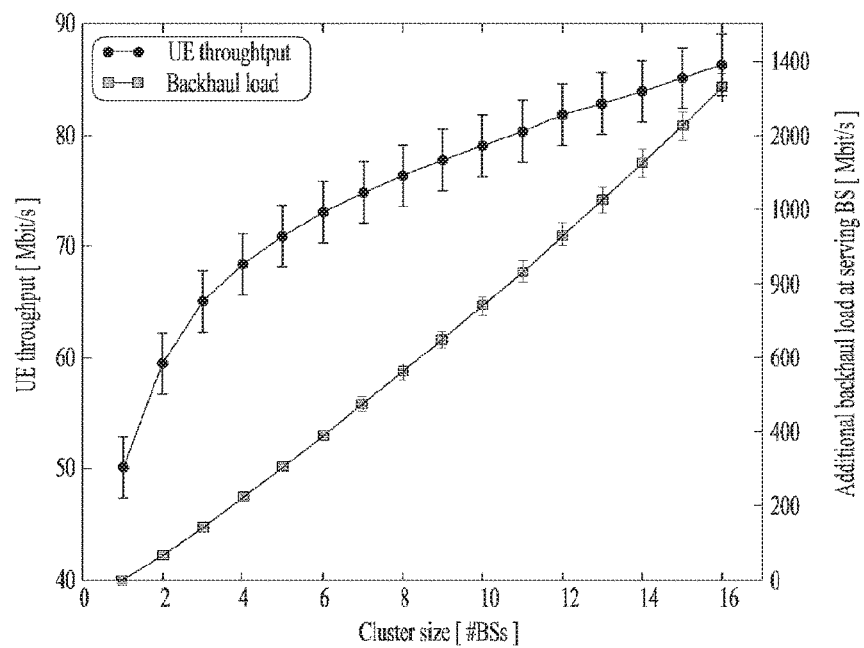
FIG. 4 shows an example of performance and cost according to a base station cluster size.

FIG. 4 shows an example of performance and cost according to a base station cluster size. In this case, the base station cluster size may correspond to the number of physical base stations forming a base station cluster.

Referring to FIG. 4, performance and cost according to a cluster size have a trade-off relation with each other. In an example of FIG. 4, the performance corresponds to a transfer rate of a user equipment and the cost may correspond to load on a backhaul. For better performance, it is preferable to form more base station as a cluster. Yet, cost for additional base stations may also increase. And, as shown in the example of FIG. 4, as a cluster size increases, performance (e.g., a transfer rate of a user equipment) increases with a log scale (logarithmetic scale) and cost (e.g., backhaul load) may increase with a linear scale. Hence, if the cluster size increases more than a prescribed level, cost loss may become greater than performance gain. Yet, an appropriate cluster size corresponds to not a value identically applied to all network environments but a value varying according to a network environment. For instance, in the aspect of interference control and base station cooperative communication (e.g., CoMP communication), if base stations are distributed with high density, a big cluster size may be profitable. On the contrary, if base stations are distributed with low density, a small cluster size may be profitable. Not only the cluster size but also whether a cluster is formed statically or dynamically can significantly impact on performance.

Figure 5:
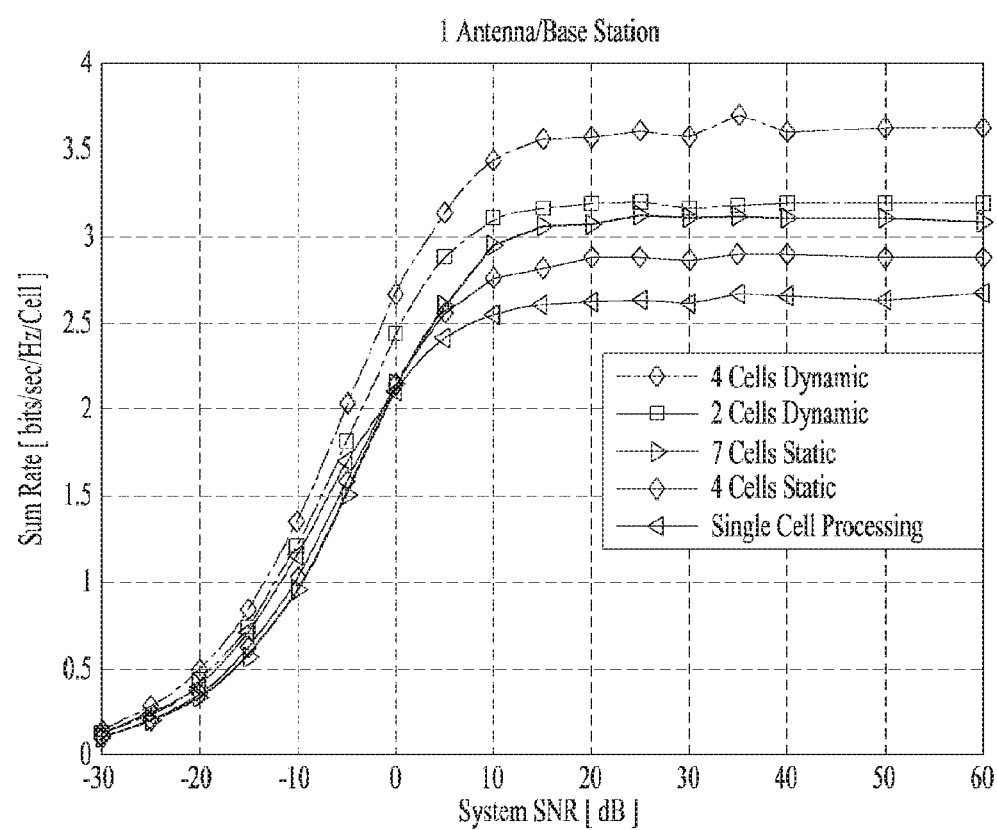
FIG. 5 shows an example for performance of static clustering and dynamic clustering.

FIG. 5 shows an example for performance of static clustering and dynamic clustering. The static clustering indicates that a network statically forms a base station cluster irrespective of a state of a user equipment and the dynamic clustering indicates that the network dynamically forms the base station cluster appropriate for the state of the user equipment. There is a difference between the static clustering and the dynamic clustering in whether it is able to eliminate a cluster edge effect. The cluster edge effect corresponds to a reason similar to performance degradation of user equipments located at a cell edge of a legacy cellular network (i.e., performance degradation caused by a far transmission distance of a data signal and a close transmission distance of an interference signal). The cluster edge effect indicates a phenomenon that performance of a user equipment located at an edge of a cluster is deteriorated. In case of statically forming a cluster, the cluster edge effect may continuously occur. Yet, if a base station cluster is dynamically formed in accordance with a user equipment, the cluster edge effect can be eliminated.

Referring to FIG. 5, it is assumed that a base station performs communication using a single antenna. An example of FIG. 5 shows each performance when a cluster is dynamically formed by 4 cells (4 cells dynamic), when a cluster is dynamically formed by 2 cells (2 cells dynamic), when a cluster is statically formed by 7 cells (7 cells static), when a cluster is statically formed by 4 cells (4 cells static) and when processing is performed by a single cell (single cell processing). In general, as a cluster size is increasing, performance is also increasing. Yet, as shown in FIG. 5, when two base stations dynamically form a cluster, it may have better performance compared to performance when a cluster is statically formed by 7 base stations. In particular, referring to an example of FIG. 5, it shows that dynamic clustering is able to obtain a higher total transfer rate (sum rate) in a same SNR (Signal to Noise Ratio) compared to static clustering.

As mentioned in the foregoing description, although the dynamic clustering is better to eliminate the cluster edge effect, it may be able to eliminate the cluster edge effect using a different method. As a different example, it is also able to eliminate the cluster edge effect by forming a UE-centered base station cluster. If a base station cluster itself is formed according to a user equipment, it is able to prevent a user equipment from being existed in a cluster edge. In the aspect of a single user equipment, since a base station cluster configured to transmit data to the user equipment is fixed, data/channel information sharing or control signal processing can be simply performed between base stations. If a cluster is dynamically changed, the data/channel information sharing or the control signal processing should be changed in accordance with the dynamically changing cluster.

Hence, the present invention proposes a method i) capable of appropriately controlling a correlation between performance and cost, the method ii) adaptive to network environment and the method ii) capable of forming a UE-centered base station cluster.

First of all, variables for explaining the present invention are defined. Assume a network including M number of base stations (or a set of base stations) and K number of user equipments (or a set of user equipments). A cluster indicator is defined as $J_{mk}$. The cluster indicator indicates whether or not a specific user equipment includes a specific base station in a base station cluster for the specific user equipment. For example, if a user equipment k includes a base station m in a cluster of the user equipment, the cluster indicator may have a value of 1. Otherwise, the cluster indicator may have a value of 0. Hence, a set of base station clusters formed by the user equipment k can be represented as $M_k=\{m\in M|J_{mk}=1\}$ and a set of user equipments including the user equipments as a cluster for the base station m can be represented as $K_m=\{k\in K|J_{mk}=1\}$.

Among the two types of metrics for performance and cost, a metric f(J) for cost can be defined as Equation 1 in the following.

$$f(J) = \sum_{m \in M, k \in K} J_{mk} \quad \text{[Equation 1]}$$

The metric shown in Equation 1 corresponds to a metric defined based on load occurred on a backhaul network that increases according to a cluster size. The cost metric f(J) may be non-limited by the linear increase. For example, modeling can be performed on the cost metric f(J) by a convex increasing function.

Subsequently, a metric for performance is explained. A performance metric for a user equipment k can be defined as Equation 2 in the following using a PSTSR (potential signal to total signal ratio).

$$\gamma_k = \frac{\sum_{m \in M_k} \bar{P}_m R_{mk}^{-\alpha} a_{mk}}{\sum_{m \in M} \bar{P}_m R_{mk}^{-\alpha}} \quad \text{[Equation 2]}$$

In Equation 2, $\bar{P}_m$ corresponds to transmit power of a base station m, $R_{mk}^{-\alpha}$ corresponds to path loss between the base station m and the user equipment k and $a_{mk}$ corresponds to a resource allocation gain from the base station to the user equipment k. When the user equipment k forms a cluster $M_k$, an average transfer rate capable of being obtained by the user equipment k can be determined according to scheduling, transmit power allocation, and a precoder controlling scheme. Yet, since it is impossible to find out the average transfer rate by a closed form, it may use PSTSR for approximating the average transfer rate. And, maximum load capable of being occurred on each base station is defined as $L_m$.

A problem of minimizing cost caused by forming a cluster while securing minimum performance of each user equipment can be formulated as Equation 3 in the following.

[Equation 3]

$$\min_J \sum_{m \in M, k \in K} J_{mk} \quad (3\text{-}1)$$

$$\text{s.t.} \quad \gamma_k = \frac{\sum_{m \in M} J_{mk} \bar{P}_m R_{mk}^{-\alpha} a_{mk}}{\sum_{m \in M} \bar{P}_m R_{mk}^{-\alpha}} \geq \gamma, \quad \forall k \in K \quad (3\text{-}2)$$

$$\sum_k J_{mk} \leq L_m, \forall m \in M \quad (3\text{-}3)$$

$$J_{mk} \in \{0, 1\} \quad (3\text{-}4)$$

In Equation 3, γ corresponds to a minimum performance value guaranteed to a user equipment. A first constraint (Equation 3-2) is used for constraining load according to a base station. A problem of Equation 3 to 6 becomes a problem of combinatorial optimization due to a last constraint (Equation 3-4) and it may be difficult to solve. Yet, if the constraint of the Equation 3-4 is relaxed as $0 \leq J_{mk} \leq 1$, the problem of Equation 3 becomes a problem of convex optimization. Hence, the problem can be solved using a well-known primal-dual algorithm. Hence, if the constraint of Equation 3-4 is relaxed, as shown in Table 1 in the following, the problem of Equation 3 can be decomposed to three problems and it may be able to find out a solution for each problem.

TABLE 1

| Decomposed problem | Solution |
|---|---|
| Primal problem 1 ∀m, k $$\min_{0 \leq J_{mk} \leq 1} J_{mk}\left(1 - \frac{x_k S_{mk} a_{mk}}{\sum_{m'} S_{m'k}} + y_m\right)$$ | $$J_{mk} = \begin{cases} 1, & \text{if } S_{mk} > \frac{w_{mk}}{x_k}(1+y_m) \\ z, & \text{if } S_{mk} = \frac{w_{mk}}{x_k}(1+y_m) \\ 0, & \text{otherwise} \end{cases}$$ where $S_{mk} = \bar{P}_m R_{mk}^{-\alpha}$, $w_{mk} = \frac{\sum_{m'} S_{m'k}}{a_{mk}}$, $0 < z < 1$ |
| Dual problem 1 ∀k $$\max_{x_k \geq 0} x_k\left(\gamma - \sum_m \frac{J_{mk} S_{mk} a_{mk}}{\sum_{m'} S_{m'k}}\right)$$ | $$x_k \leftarrow \left[x_k + \alpha\left(\gamma - \sum_m \frac{J_{mk} S_{mk} a_{mk}}{\sum_{m'} S_{m'k}}\right)\right]^+$$ |
| Dual problem 2 ∀m $$\max_{y_m \geq 0} y_m\left(\sum_k J_{mk} - L_m\right)$$ | $$y_m \leftarrow \left[y_m + \alpha\left(\sum_k J_{mk} - L_m\right)\right]_0^{y_{max}}$$ |

In Table 1, since $x_k$ corresponds to a value deducted from the constraint of Equation 3-2, the $x_k$ corresponds to a value related to performance of the user equipment k. Since $y_m$ corresponds to a value deducted from the constraint of Equation 3-3, the $y_m$ corresponds to a value related to load of the base station m. $P_m$ corresponds to transmit power of the base station m and $R_{mk}^{-\alpha}$ corresponds to a path loss between the base station m and the user equipment k. Hence, $S_{mk}$ indicates a signal strength depending on the path loss between the user equipment k and the base station m only. $w_{mk}$ corresponds to a value of the sum of signal strength received from base stations transmitting a signal to the user equipment k divided by a resource allocation gain from the base station m to the user equipment k. Hence, the $w_{mk}$ corresponds to a value related to a network situation. A set of base station clusters configured by the user equipment k can be determined by Equation 4 in the following based on the solutions of Table 1.

$$M_k = \left\{ m \in M \,\middle|\, S_{mk} \geq \frac{w_{mk}}{x_k}(1+y_m) \right\}$$ [Equation 4]

In Equation 4, if signal strength $S_{mk}$ depending on the path loss between the user equipment k and the base station m only is greater than a specific threshold value $$\frac{w_{mk}}{x_k}(1+y_m),$$

the base station m can be selected as a cluster base station of the user equipment. In Equation 4, a threshold value is determined by three variables $w_{mk}$, $x_k$, and $y_m$. As mentioned in the foregoing description, the variables correspond to values related to a network situation, performance perceived by the user equipment, and load occurred on the base station, respectively. And, the two values $x_k$ and $y_m$ correspond to adaptively determined values. For example, if performance of the user equipment is not guaranteed, the $x_k$ increases. In this case, a threshold value decreases. And, for example, if load of a specific base station is large, the $y_m$ increases. In this case, a threshold value increases.

Hence, a base station clustering method according to the present invention is to form base stations appropriate for the user equipment k as a cluster based on the signal strength $S_{mk}$ with the base station m and the load information $y_m$ of the base station m capable of being measured by the user equipment k.

Meanwhile, a previously proposed base station clustering algorithm can be summarized as Equation 5 to Equation 7 described in the following.

Highest-N BS clustering: Method of forming N number of base stations of which a signal strength is highest as a cluster. A base station cluster set $M_k$ can be determined by Equation 5 in the following. For clarity, this method can be called highest-N clustering.

$$M_k = \{m \in M | S_{mk} \geq S_{m'k}, m' \text{ is Nth } BS\}$$ [Equation 5]

Absolute signal threshold based clustering: Method of forming base stations of which a signal strength is equal to or greater than a threshold as a cluster. A base station cluster set $M_k$ can be determined by Equation 6 in the following. For clarity, this method can be called absolute clustering.

$$M_k = \{m \in M | S_{mk} \geq \gamma\}$$ [Equation 6]

Relative signal threshold based clustering: Method of forming base stations of which best signal to signal strength is equal to or greater than a threshold as a cluster. A base station cluster set $M_k$ can be determined by Equation 7 in the following. For clarity, this method can be called relative clustering.

$$M_k = \{m \in M | S_{mk} \geq \gamma S_{m^*k}, m^* \text{ is best } BS\}$$ [Equation 7]

The previously proposed clustering methods do not include a function of adaptively controlling a threshold in consideration of a difference of network environments different from each other according to each user equipment. On the contrary, since the base station clustering method according to the present invention can adaptively form a cluster in consideration of network environment (signal strength with a base station, load of a base station) while performance of a prescribed level is secured, it is very useful.

FIG. 6 and FIG. 7 are diagrams for examples of comparing performance of a base station clustering method according to the present invention with performance of legacy clustering methods. The performance shown in FIGS. 6 and 7 corresponds to a result deducted from simulation performed under an assumption that there are 400 user equipments in a prescribed area. The example of FIG. 6 shows a result for a case that 25 base stations are distributed in an area of 10×10 km² and the example of FIG. 7 shows a result for a case that 50 base stations are distributed in an area of 10×10 km². Hence, the example of FIG. 6 corresponds to a case of low density and the example of FIG. 7 corresponds to a case of high density. In this case, transmit power of each base station corresponds to 43 dBm, a path loss follows a formula of $128.1+37.6\times\log_{10}(d)$ and the d corresponds to a distance of a km unit. In the proposed scheme, assume that $\alpha_{mk}$ corresponds to 1 and there is no limit on load of a base station. And, in FIG. 6 and FIG. 7, "A-signal Thr." indicates the absolute signal threshold based clustering according to Equation 6, "R-signal Thr." indicates the relative signal threshold based clustering according to Equation 7, "Highest-N" indicates the highest-N base station clustering according to Equation 5 and "Adaptive Thr." indicates the base station clustering according to the present invention.

As shown in FIG. 6 and FIG. 7, in order to enhance performance, it may require increase of cost corresponding to the enhanced performance. Among the four schemes, the highest-N clustering or the absolute clustering shows bad performance compared to the relative clustering or the adaptive clustering according to the present invention. For example, the highest-N clustering or the absolute clustering requires higher cost on the basis of same performance or shows bad performance on the basis of same cost.

And, as shown in FIG. 6 (a) or FIG. 7 (a), in terms of average performance of all user equipments in a network, the adaptive clustering scheme according to the present invention and the relative clustering scheme show a similar result. Yet, as shown in FIG. 6 (b) or FIG. 7 (b), in terms of a user equipment having performance of lower 30% or a user equipment having worst performance, the adaptive clustering scheme according to the present invention shows a far better result compared to the relative clustering scheme. For instance, the adaptive clustering scheme according to the present invention considerably enhances performance on the basis of a same cost and requires a far less cost on the basis of same performance. This is because, since the base station clustering method according to the present invention considers a difference between network environments perceived by each user equipment, increases a cluster size when network environment is bad and decreases the cluster size when the network environment is good, the adaptive clustering method makes a cost to be used for forming a cluster of a user equipment requiring more cost when the total cost is same. This can be more firmly checked from a result that there is no difference between an average of user equipments having lower 30% performance and a user equipment of lowest performance. Hence, it might say that the base station clustering method according to the present invention has a merit in forming a UE-centered base station cluster in consideration of network environment experienced by an individual user equipment.

Figure 8:
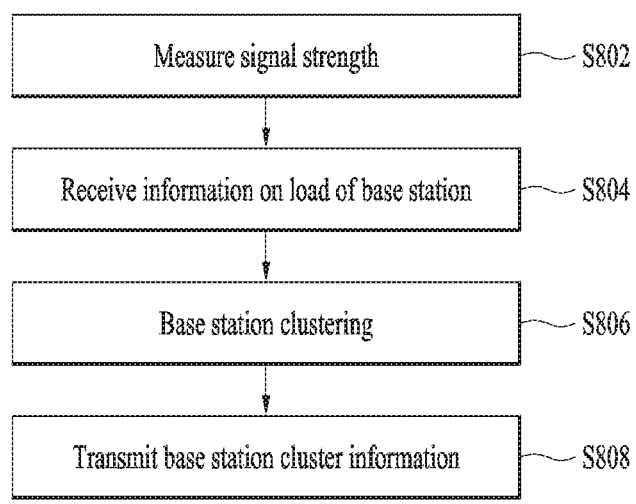
FIG. 8 is a flowchart for a base station clustering method according to the present invention.

FIG. 8 is a flowchart for a base station clustering method according to the present invention. If a new equipment is added to a network and network environment is changed by mobility of a user equipment, it is able to perform base station clustering to form a new base station cluster.

In the step S802, a user equipment can measure strength of a signal transmitted from a base station. As an example, a measurement target signal may correspond to a reference signal. And, as an example, the measurement target signal can be periodically broadcasted from the base station.

In the step S804, the user equipment can receive load information. For example, the load information may indicate load occurred on a backhaul network. As a different example, the load information may indicate load occurred on a base station or load occurred on a current base station cluster.

In an example of FIG. 8, although it is depicted as the step S802 and the step S804 are separately performed, the steps can be performed together in the same step or can be performed in a reverse order. For example, when the user equipment receives the load information from the base station, the user equipment can measure strength of a signal of the base station using a reference signal received together with the signal. In particular, the user equipment can measure signal strength of the base station using the reference signal which is used for receiving the load information.

In the step of S806, the user equipment can perform base station clustering. The user equipment can determine whether or not a specific base station forms a base station cluster of the user equipment according to Equation 4 using the signal strength measured in the step S802 and the load information received in the step S804.

In the step S808, the user equipment can transmit information on the base station cluster to a network (e.g., a cloud server). Subsequently, having received the information on the base station cluster from the user equipment, the network can update base station cluster information on the user equipment.

FIG. 8 is just an example. The example of FIG. 8 can change according to the need. For example, the steps of FIG. 8 can be implemented in a manner of excluding a part of the steps and the steps of FIG. 8 can be implemented in a manner of adding an additional step to the steps. And, a part of the steps of FIG. 8 can be implemented in a manner of being modified if necessary.

Although it is not depicted in FIG. 8, it may be able to form a virtual cell using a base station cluster, which is determined in accordance with the base station clustering method according to the present invention. In case of forming the virtual cell, a radio interface can be generated between a user equipment and the virtual cell. For example, a network (e.g., a cloud server) can generate a radio interface for a control signal and feedback between one base station among a cluster formed by the user equipment based on the base station cluster information received in the step S808 and the user equipment. It may be able to generate a radio interface between a plurality of base stations among the base station cluster formed by the user equipment and the user equipment.

And, although it is not depicted in FIG. 8, a network server (e.g., a cloud server) can configure a data path to base stations configured to form a virtual cell. As an example, the base stations configured to form the virtual cell can be determined based on the base station cluster information.

Scheduling

A scheduling problem may correspond to a problem of selecting a user equipment for transmitting a data when there exist user equipments more than the number of user equipments capable of transmitting data at the same time in a network. For the scheduling problem, it is necessary to consider two things. One is feasibility of a selected UE set and another one is efficiency of the selected UE set.

The feasibility can be considered as a constraint condition of the scheduling problem. In a multi-antenna system, since it is able to transmit data to user equipments as many as the number of maximum antennas at the same time using a MU-MIMO (multi-user multiple input multiple output) scheme, the number of user equipments capable of being selected according to a base station may increase. Specifically, the number of streams equal to or less than the number of transmission antennas can be independently transmitted on a MIMO channel (Refer to D. Gesbert, M. Kountouris, R. W. Heath Jr. C.-B. Chae, and T. Salzer, "Shifting the MIMO paradigm," IEEE Signal Processing Magazine 2007.). The MU-MIMO scheme can be directly applied when not-overlapped clusters are formed. In case of the not-overlapped clusters, since a not-overlapped base station cluster can be considered as a transmission end, it is able to independently transmit streams as many as the number of virtual transmission antennas. Hence, it is able to select user equipments as many as the number of the virtual transmission antennas. Therefore, the feasibility may indicate whether the number of antennas of the transmission end is equal to or greater than the number a reception end.

A feasibility check becomes complex when an overlap of a base station cluster is permitted. If the overlap of the base station cluster is permitted, it is necessary to check whether or not the number of virtual transmission antennas of the transmission end is greater than the number of scheduled user equipments.

Figure 9:
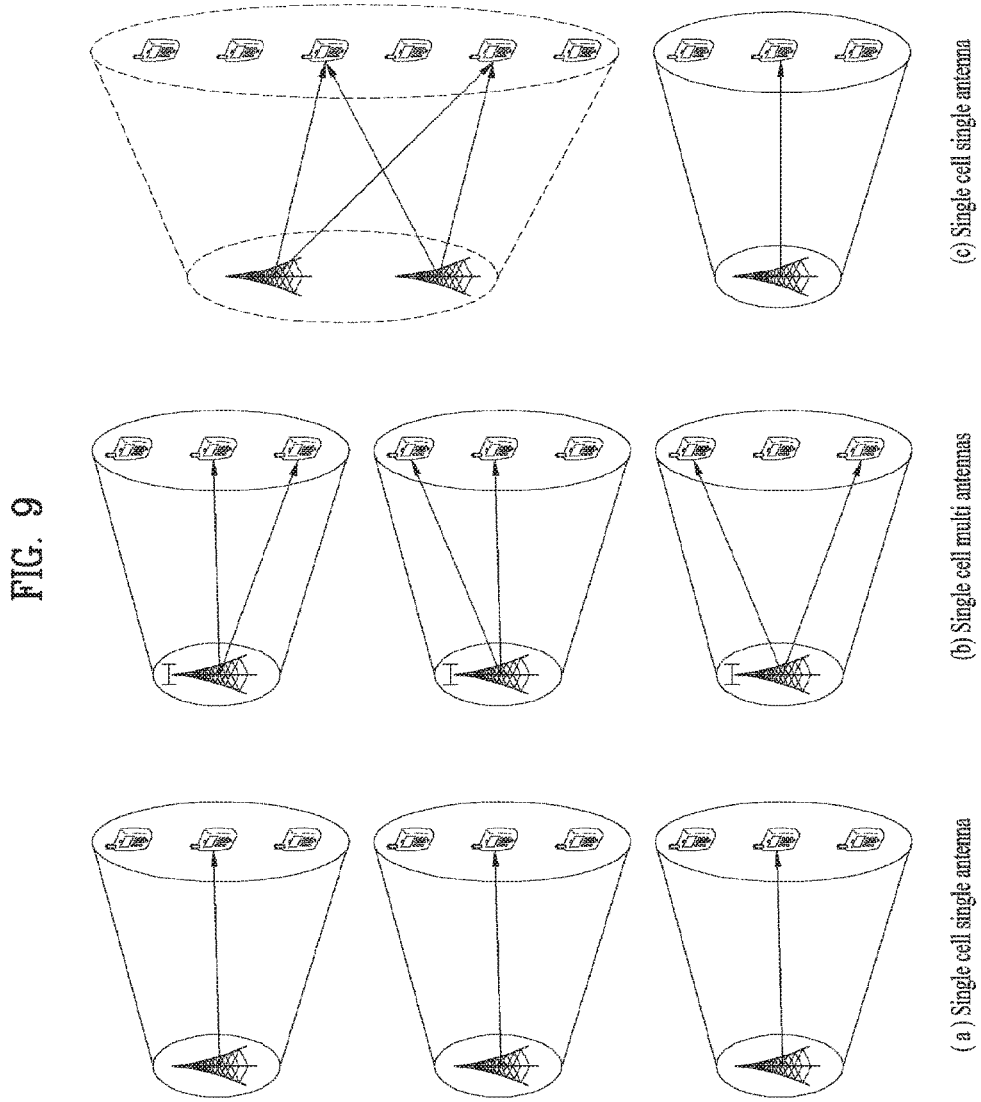
FIGS. 9 and 10 respectively show an example of feasibility when base station clusters are not overlapped with each other and when the base station clusters are overlapped with each other.
Figure 10:
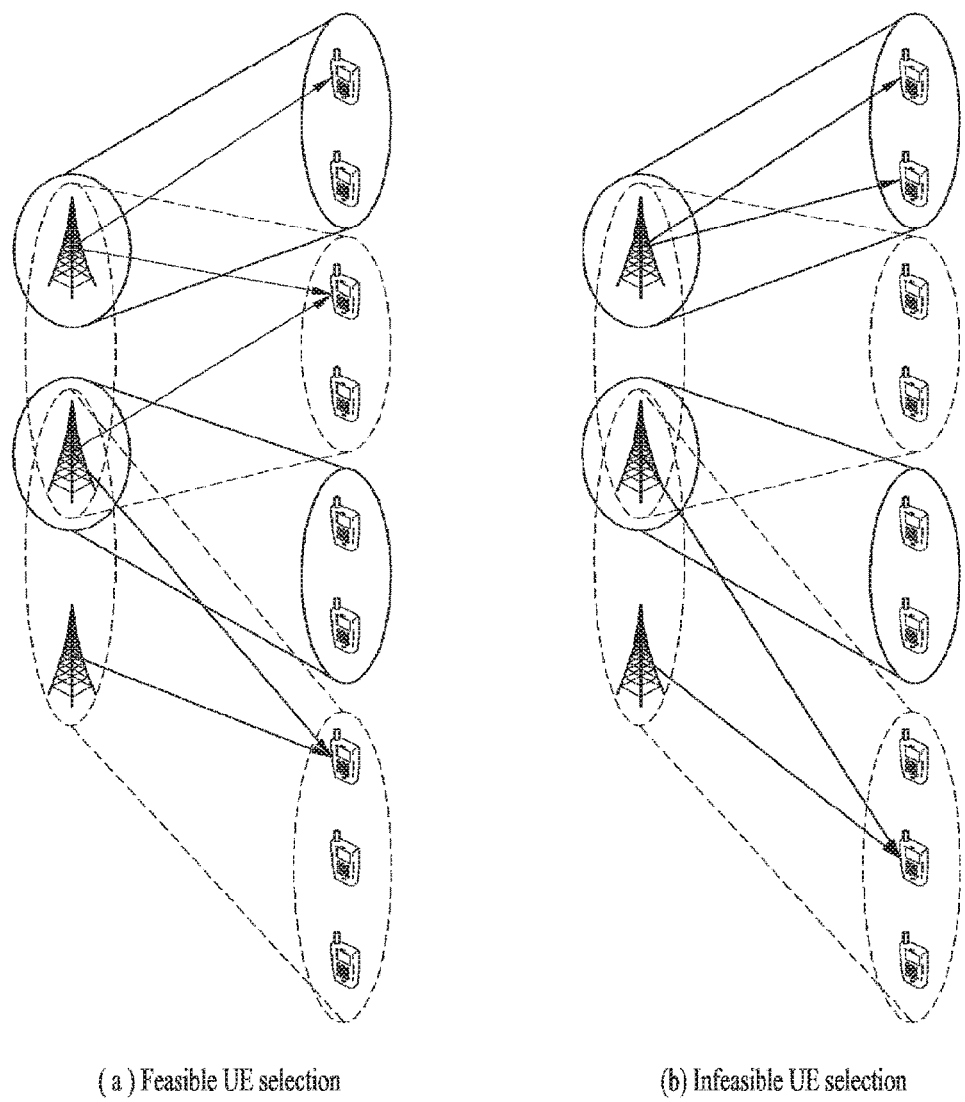

FIGS. 9 and 10 respectively show an example of feasibility when base station clusters are not overlapped with each other and when the base station clusters are overlapped with each other. A summary of feasibility from a primitive system is described in the following with reference to FIGS. 9 and 10.

Referring to FIG. 9 (*a*), it shows an example for a case of a single cell single antenna transmission system. A solid line circle indicates a single cell and an arrow indicates a user equipment scheduled by a base station. Since it is the single cell single antenna system, scheduling can be performed in a manner that one user equipment is selected per a single cell. Referring to an example of FIG. 9 (*a*), there exist 3 base stations and 3 cells and scheduling is performed in a manner that one user equipment is selected from each base station and each cell, respectively. Hence, the example of FIG. 9 (*a*) is feasible.

Referring to FIG. 9 (*b*), it shows an example for a case of a single cell multi-antenna transmission system. In this case, it may be able to select user equipments as many as the maximum number of base station antennas per a single base station. Referring to an example of FIG. 9 (*b*), since a single base station has two antennas, scheduling can be performed in a manner that 2 user equipments are selected per a single cell. And, referring to the example of FIG. 9 (b), there exist 3 base stations and 3 cells and scheduling is performed in a manner that 2 user equipments are selected from each base station and each cell, respectively. Hence, the example of FIG. 9 (b) is feasible.

Referring to FIG. 9 (c), it shows an example for a case of a base station cooperative communication system in which an overlap does not exist. A dotted line surrounding base stations indicates a base station cluster formed for base station cooperative communication and a dotted line surrounding user equipments indicates user equipments supporting cooperative communication. In this case, it may be able to select user equipments as many as the maximum number of antennas of a cluster per a single cluster (or sum of the number of base station antennas in a cluster). Referring to an example of FIG. 9 (c), there exists a single base station cluster consisting of 2 base stations and a single cell and each base station has a single antenna. Scheduling can be performed in a manner that 2 user equipments are selected from the single base station cluster consisting of 2 base stations. Or, scheduling can be performed in a manner that a single user equipment is selected from a single cell. Hence, the example of FIG. 9 (c) is feasible.

Referring to FIG. 10 (a), it shows an example for a case of a base station cooperative communication system in which an overlap exists. In this case, it may be able to select the number of user equipments belonging to a cluster smaller than the maximum number of antennas (or the sum of the number of base station antennas in the cluster) of the cluster per all random clusters capable of being considered. Referring to an example of FIG. 10 (a), there exist 2 base station clusters including 2 base stations, respectively. In this case, the clusters are overlapped with each other. Referring to the example of FIG. 10 (a), scheduling is performed in a manner that a single user equipment is selected from each cell and scheduling is performed in a manner that 2 user equipments are selected from each base station cluster. Hence, since the number of user equipments belonging to each cell can be selected to be equal to or less than the number of base station antennas and the number of user equipments belonging to each cell can be selected to be equal to or less than the total number of antennas of each cluster, the example of FIG. 10 (a) is feasible.

Referring to FIG. 10 (b), similar to FIG. 10 (a), it shows an example for a case of a base station cooperative communication system in which an overlap exists. Yet, unlike FIG. 10 (a), although a base station of a cell located at the top has a single antenna, scheduling is performed in a manner that 2 user equipments are selected in the cell. Hence, an example of FIG. 10 (b) is infeasible.

In the following, second consideration of the scheduling problem, i.e., efficiency, is explained. It is necessary to consider efficiency since every transfer rate capable of being obtained according to a selected set of user equipments is different from each other. Efficiency relates to a method of selecting a set of user equipments most enhancing a transfer rate among available UE sets. A well-known max-weight scheduling (refer to L. Tassiulas and A. Ephremides, "Dynamic server allocation to parallel queue with randomly varying connectivity," IEEE Trans. Information Theory, 1993.) or PF (proportional fairness) scheduling (refer to H. Kim, K. Kim, Y. Han, and S. Yun, "A Proportional Fair Scheduling for Multicarrier Transmission Systems," VTC 2004.) may correspond to an example of a scheduling method considering the efficiency aspect. Yet, since environment considered by the present invention corresponds to a system in which base station cooperative communication is permitted in an overlapped base station cluster, a selectable UE set is various and a transfer rate varies according to a precoding scheme or a transmit power allocation scheme. Hence, it is difficult to perform the base station cooperative communication. Methods enabling scheduling are proposed in the following.

Optimal method: For all available UE sets, a transfer rate capable of being obtained from the UE sets is represented by metric and a UE set of which the transfer rate is highest is selected.

Greedy method: A UE set is generated in a manner of adding a user making a transfer rate increase one by one from a null set.

Decomposition method: Selecting a UE from a whole of a network is divided by an orthogonal unit and a UE is selected from each part.

Although the optimal method corresponds to the best method, complexity of the optimal method is very high. Hence, it may be able to use the remaining two methods at the same time. Based on this, the present invention proposes a scheduling method capable of considering both feasibility and efficiency in a base station cooperative communication situation in which an overlap is permitted between clusters.

The scheduling method according to the present invention can be performed in a manner of being divided into 2 steps. UE grouping is performed in a manner of dividing a UE group into groups in a first step. UE selection for data transmission is performed via the greedy method according to each UE group in a second step. According to the present invention, feasibility is considered in the UE grouping step and efficiency is considered in a process of selecting a UE using the greedy method in the UE selection step.

First of all, variables necessary for explaining the present invention are defined. A base station set and a UE set are defined as M and K, respectively. Assume that a base station m has $N_{T,m}$ number of antennas and a UE has a single antenna (It is able to identically/similarly apply the assumption when the UE has multiple antennas). A set of UEs selected from all UEs (or a UE set) by scheduling is represented as S g K. A set of base stations configured to transmit data to a UE according to each UE is defined as $C_k$. In this case, a feasibility condition for the set S of the scheduled UEs can be given as Equation 8 in the following.

$$TX(c) \geq RX(c,S), \forall c \in C(S) \quad \text{[Equation 8]}$$

where $TX(c)=\Sigma_{m \in c} N_{T,m}$, $RX(c,S)=|\{k \in S | C_k \subseteq c\}|$, $C(S)=\{C_k, \forall k \in S\}$ In Equation 8, TX(c) indicates the number of virtual transmission antennas of a cluster c, RX(c,S) indicates the number of virtual reception antennas of the cluster c and C(S) indicates a set of clusters performing transmission for a scheduled UE. Hence, the condition of Equation 8 corresponds to a condition that the number of antennas of a transmitting side should be equal to or greater than the number of UEs when a virtual MIMO channel is configured for all clusters performing transmission. If the number of antennas of the transmitting side is less than the number of UEs, a channel independent from each other may not be formed between streams transmitted at the same time.

The present invention proposes a least loaded group mapping method as a scheme for the first step (grouping of a set of all UEs). The least loaded group mapping method corresponds to a method of sequentially mapping a UE from a group including a least load. In this case, in order to satisfy feasibility, it may be able to group UE sets to satisfy two conditions shown in Table 2 in the following.

TABLE 2

Each group includes one or more corresponding base stations and each base station corresponds to a single group only.
Each user equipment may belong to a single group only and the group should include one of cluster base stations of the user equipment.

When UE grouping satisfying the two conditions of Table 2 is performed, if a feasibility condition is satisfied in a group, overall feasibility condition can be satisfied. Hence, feasibility can be checked with a very low complexity. In particular, if a group has a single base station only, greedy scheduling, which is performed according to each group, is always able to find out a set of UEs satisfying the feasibility condition without a feasibility check. In the following, for clarity, a case that a group has a single base station only is described. Yet, if the aforementioned two conditions are satisfied, it is also able to easily extend to a case that a group has one or more base stations.

FIG. 11 shows an example of least loaded group mapping according to the present invention. In the example of FIG. 11, "MS ID" (mobile station identifier) indicates an identifier of a user equipment and "Cluster BS ID" (Cluster base station identifier) corresponds to an identifier indicating a base station of a base station cluster corresponding to the user equipment. "Load" indicates load of each base station. As a number of the "Load" is higher, it indicates higher load. "Group ID" indicates an identifier of a group to which each user equipment is mapped. Assume that a single base station belongs to each group only and each group is represented as A, B or C similar to a BS ID. In the example of FIG. 11, assume that 3 base stations (A, B and C) and 5 user equipments (1, 2, 3, 4 and 5) form an overlapped cluster in a network. Assume that each user equipment sequentially determines a group of its own from the user equipment 1.

Referring to FIG. 11, in case of the user equipment 1, since load of 3 groups (A, B and C) to which a base station cluster of the user equipment 1 belongs thereto corresponds to 0, the user equipment 1 can select one of the 3 groups. In the present example, the user equipment 1 selects a group A. In case of the user equipment 2, the user equipment 2 selects a group of which load is less among two groups (A and B) to which a base station cluster of the user equipment 2 belongs. In the present example, since load of the group A corresponds to 1 and load of the group B corresponds to 0, the user equipment 2 selects the group B of which load is less. In case of the user equipment 3, since a group to which a base station cluster of the user equipment 3 belongs corresponds to the group A only, the user equipment 3 selects the group A. In case of the user equipment 4, the user equipment 4 selects a group of which load is less among 2 groups (B and C) to which a base station cluster of the user equipment 4 belongs. In the present example, since load of the group B corresponds to 1 and load of the group C corresponds to 0, the user equipment 4 selects the group C of which load is less. In case of the user equipment 5, the user equipment 5 selects a group of which load is less among 3 groups (A, B and C) to which a base station cluster of the user equipment 5 belongs. In the present example, since the load of the group B and the load of the group C are least as 1, the user equipment 5 can select one of the group B and the group C. In the present example, the user equipment 5 selects the group B.

Consequently, the user equipment 1 and 3 are mapped to the group A, the user equipment 2 and 5 are mapped to the group B and the user equipment 4 is mapped to the group C.

In this case, it is able to know that a set of user equipments mapped to each group always satisfy the feasibility condition of Table 2.

UE grouping is firstly performed as a first step and a step of selecting a user equipment for scheduling can be performed as a second step. As mentioned in the foregoing description, the step of selecting a user equipment can be performed through the greedy method.

FIG. 12 shows an example of a greedy scheduling method in base station cooperative communication environment in which a cluster overlapping is permitted. For clarity of explanation, the method of FIG. 12 is represented in a pseudo code form. FIG. 12 shows a UE scheduling algorithm using a general greedy algorithm.

In an example of FIG. 12, isFeasible(S∪{k}) corresponds to a function for checking whether or not a given UE set S∪{k} satisfies a feasibility condition and ExpRate(S) corresponds to a transfer rate expected from the given UE set S.

FIG. 13 shows an example of a group-based greedy UE scheduling method in base station cooperative communication environment in which a cluster overlapping is permitted according to the present invention. For clarity of explanation, the method of FIG. 13 is represented in a pseudo code form. In FIG. 13, since greedy scheduling is performed based on a UE group according to the present invention, it is able to reduce complexity.

Specifically, the group-based greedy scheduling of FIG. 13 can be performed for each group. In the step 1, a UE set ($S_m$) is initialized for each group m. In particular, the UE set $S_m$ can be initialized by a null set. In the step 2, it is able to determine whether or not the number of user equipments belonging to the UE set $S_m$ is less than the total number of base station antennas $N_{T,m}$ corresponding to a group m. Steps 3 to 13 are repeated while the number of user equipments belonging to the UE set $S_m$ is less than the total number of base station antennas $N_{T,m}$. If the number of user equipments belonging to the UE set $S_m$ is equal to or greater than the total number of base station antennas $N_{T,m}$, the method of FIG. 13 can be terminated.

In the step 3, a temporary variable (val) related to expected performance of the UE group is initialized. In the step 4, steps 5 to 9 are repeated for each group and each UE belonging to each group. In the step 5, it is able to determine whether or not performance, which is expected when a specific UE k is included in the UE set $S_m$, is greater than a value stored in the temporary variable val. In the step 6, if the expected performance is greater than the value stored in the temporary variable, a UE set $S'_m$ is formed in a manner of including the specific UE k in the UE set $S_m$. In the step 7, the performance, which is expected when the specific UE k is included in the UE set $S_m$, is updated by the temporary variable val. For example, the steps 5 to 9 compare the performance, which is expected when the specific UE k is included in the UE set $S_m$, and performance, which is expected when the specific UE k is not included in the UE set $S_m$ with each other. If the performance, which is expected when the specific UE k is included in the UE set $S_m$, is greater than the performance, which is expected when the specific UE k is not included in the UE set $S_m$, the steps 5 to 9 can include a step of including the specific UE k in the UE set $S_m$.

After the steps 5 to 9 are repeated for each group and all UEs belonging to each group, performance expected in the legacy UE set $S_m$ and performance expected in the new UE set $S'_m$ are compared with each other in the step 10. In the step 11, if the performance expected in the new UE set $S'_m$ is equal to or less than the performance expected in the legacy UE set $S_m$, in particular, if there is no progress in the performance expected in the new UE set $S'_m$ compared to the performance expected in the legacy UE set $S_m$, the method of FIG. 13 is terminated. If the performance expected in the new UE set $S'_m$ is greater than the performance expected in the legacy UE set $S_m$, in particular, if there is a progress in the performance expected in the new UE set $S'_m$ compared to the performance expected in the legacy UE set $S_m$, the UE set $S'_m$ is updated by the legacy UE set $S_m$ in the step 13 and it is able to return to the step 2. If there is no progress in the performance expected in the new UE set $S'_m$ compared to the performance expected in the legacy UE set $S_m$, the method of FIG. 13 can be terminated.

Specifically, a difference between the greedy scheduling algorithm mentioned earlier in FIG. 12 and the example of FIG. 13 is in that a selection target of user equipment is reduced from all user equipments to user equipments belonging to each group and a part of checking a feasibility condition does not exist. Hence, the group-based greedy algorithm of FIG. 13 does not check whether or not the number of antennas of a transmitting end is equal to or greater than the number of antennas of a receiving end. For example, isFeasible(S∪{k}) performed in the step 5 of FIG. 12 is not performed in FIG. 13 (refer to steps 4 to 9 of FIG. 13). If algorithm complexity are compared with each other according to the aforementioned difference, complexity of the group-based greedy scheduling method (refer to FIG. 13) according to the present invention corresponds to $O(KN_T)$ and complexity of a general greedy scheduling method (refer to FIG. 12) corresponds to $O(KMN_T|C|)$. In this case, K indicates the number of user equipments, M indicates the number of base stations, $N_T$ indicates the number of transmission antennas of a base station, and as shown in Equation 8, C indicates a cluster set and satisfies a $|C| \leq \max(K, 2^M-1)$ condition. For instance, if it is assumed that there are 100 single antenna user equipments and 10 base stations respectively equipped with 2 antennas, the complexity of the method (refer to FIG. 13) according to the present invention corresponds to 200. On the contrary, the complexity of the general greedy scheduling method (refer to FIG. 12) becomes 2e5. For reference, in case of searching for all available user equipment sets (optimal method), the complexity becomes 5.35e20. In the aspect of calculation complexity, the optimal method is realistically impossible. Although the general greedy scheduling method is more realistic than the optimal method, if a network becomes huge, the general greedy scheduling method requires higher complexity. Hence, it is able to know that the proposed method according to the present invention (refer to FIG. 13) is far more efficient.

Figure 14:
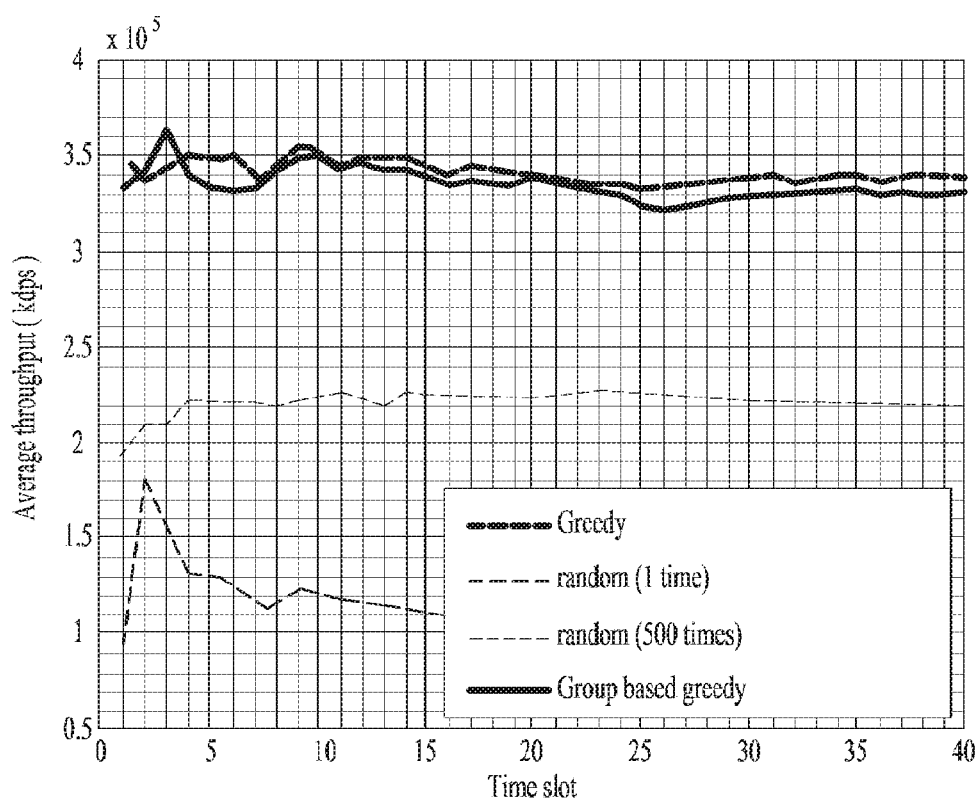
FIG. 14 and FIG. 15 show an example of comparing performance of the group-based scheduling method according to the present invention and performance of other scheduling methods with each other.
Figure 15:
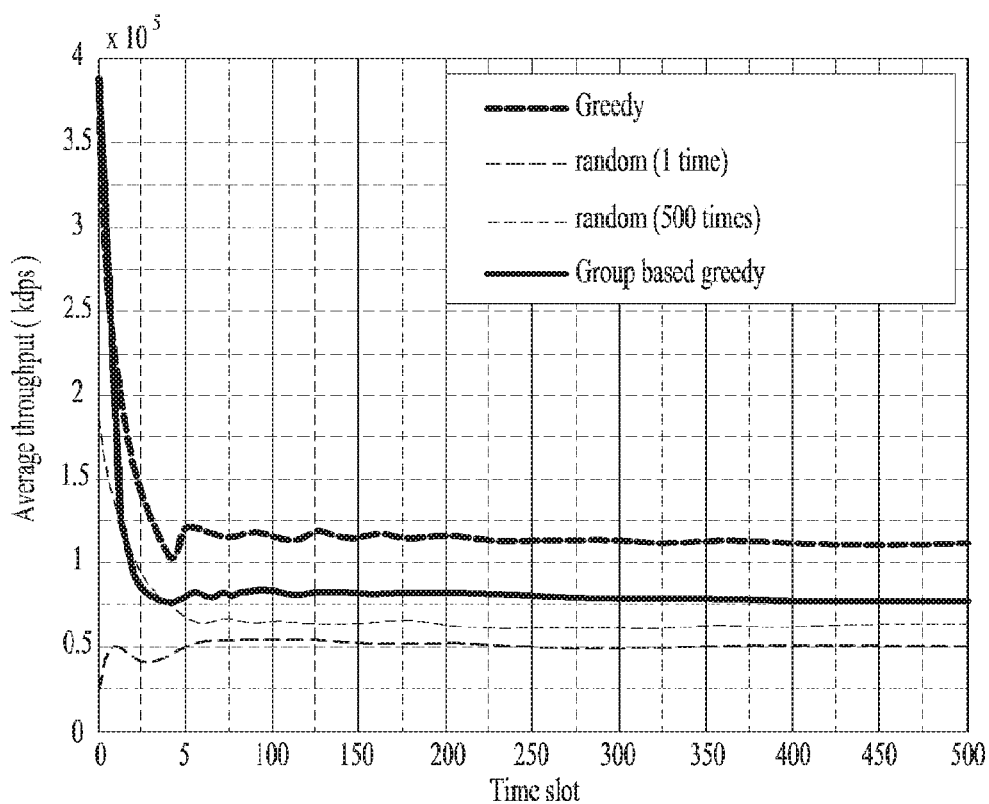

FIG. 14 and FIG. 15 show an example of comparing performance of the group-based scheduling method according to the present invention and performance of other scheduling methods with each other. Results of FIG. 14 and FIG. 15 are deducted from simulation. For environment of the simulation, 5 base stations and 100 user equipments are randomly distributed in an area of 5×5 km². And, each base station is equipped with 2 antennas and is configured to have transmit power capacity of 43 dBm and a frequency band of 5 MHz. Modeling is performed on a channel between a base station and a user equipment in a manner of reflecting path loss and shadowing to the channel. In this case, each path loss follows a formula of $128.1+37.6 \times \log_{10}(d)$, d corresponds to a distance in km unit, and shadowing of a channel has dispersion of 8 dB. ExpRate(S) corresponds to a sum of data transfer rate expected from a base station cluster for each user equipment set when a zero forcing precoding scheme and an equal power allocation are applied.

And, "Greedy" described in FIGS. 14 and 15 indicates a method according to the general greedy scheduling algorithm for selecting a user equipment from a whole of a network in accordance with FIG. 12. "Random" indicates a random selection method for randomly selecting a set of user equipments. In case of the random selection method, a result of the random selection method is shown in a manner of being divided into a case of performing a random selection one time ("random (1 time)") and a case of selecting a set of which a highest transfer rate is expected by repeatedly performing a random selection 500 times ("random (500 times)"). "Group based greedy" indicates a method according to the group-based greedy scheduling algorithm mentioned earlier in FIG. 13.

FIG. 14 shows an example for a result of performing scheduling with a policy for maximizing sum-rate of a whole network. Referring to FIG. 15, in case of a sum of an average transfer rate of each user equipment, it is able to know that there is no difference between a general greedy scheduling method (refer to FIG. 12) and a group-based greedy scheduling method according to the present invention (97% compared to the general greedy scheduling method). Yet, it is able to know that there is performance degradation in a random selection method depending on randomness in the aspect of repetitive performance or efficiency.

FIG. 15 shows an example for a result of performing scheduling with a proportional fair policy for maximizing a weighted sum-rate of a whole network and providing a weight by an inverse number of an average transfer rate. In case of the proportional fair policy, as shown in FIG. 15, the group-based greedy scheduling method according to the present invention shows performance of 70% compared to performance of the general greedy scheduling method. The difference can be reduced in a manner of reducing the number of groups. Yet, complexity may increase instead.

Consequently, the group-based greedy scheduling method according to the present invention is profitable in that complexity can be considerably reduced while performance degradation is not considerable compared to the general greedy scheduling method.

Figure 16:
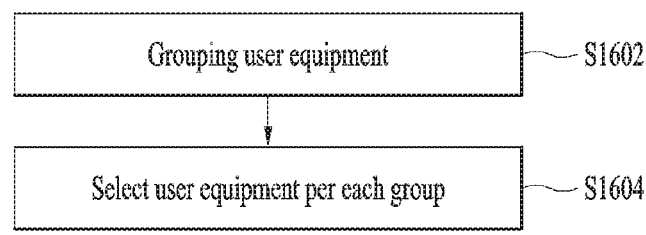
FIG. 16 shows an example for a flowchart of a scheduling method according to the present invention.

FIG. 16 shows an example for a flowchart of a scheduling method according to the present invention.

Referring to FIG. 16, in the step S1602, a network (e.g., a cloud server) is able to perform grouping in a manner of dividing all UE groups into a prescribed number of groups. As an example, UE grouping can be performed using a least loaded group mapping method. And, as an example, UE grouping can be performed in a manner of satisfying a condition of Equation 8. And, as an example, UE grouping can be performed in a manner of satisfying a condition of Table 2.

In the step of S1604, a network (e.g., a cloud server) can perform scheduling in a manner of selecting a user equipment appropriate for each group. as an example, UE grouping can be performed via the group-based greedy scheduling method shown in the example of FIG. 13. As a different example, UE grouping can be performed via the greedy scheduling method shown in the example of FIG. 12.

FIG. 16 is just an example. The example of FIG. 16 may change according to necessity. For example, the steps of FIG. 16 can be implemented in a manner of excluding a part of the steps from the steps or the steps can be implemented in a manner of adding a different step to the steps. And, it may be able to modify a part of the steps among the steps of FIG. 16 if necessary.

Precoding

In order to overcome a radio transmission capacity limitation of a single antenna system, it may use multiple antennas. As mentioned in the foregoing description, a transmission scheme using multiple antennas is called MIMO (multiple input multiple output). The MIMO scheme can obtain considerable amount of gain in proportion to the number of antennas. For the MIMO scheme, study on various application methods including SU-MIMO (single user MIMO) indicating a case that there exist a single base station and a user equipment only, MU-MIMO (multi-user MIMO) indicating a case that there exist a single base station and a plurality of user equipments and network MIMO indicating a case that there exist a plurality of base stations and a plurality of user equipments is in progress (refer to D. Gesbert, M. Kountouris, R. W. Heath Jr. C.-B. Chae, and T. Salzer, "Shifting the MIMO paradigm," IEEE Signal Processing Magazine 2007.).

Yet, in case of using multiple antennas, a gain of using the multiple antennas may vary depending on a method of transceiving information with a plurality of antennas. A scheme for a transmitting side to appropriately process data and transmit the data via multiple antennas before the data is transmitted is called precoding. On the contrary, a scheme for a receiving side to appropriately process data is called postcoding.

FIG. 17 shows an example of precoding in various MIMO environments.

In relation to precoding, methods such as zero-forcing (ZF) (refer to Q. H. Spence, A. L. Swindlehurst, and M. Haardt, "Zero-forcing methods for downlink spatial multiplexing in multi-user MIMO channels," IEEE Trans. Signal Processing, 2004.) or block diagonalization (BD)(refer to Z. Shen, R. Chen, J. G Andrews, R. W. Heath Jr., and B. L. Evans, "Sum capacity of multiuser MIMO broadcast channels with block diagonalization," IEEE Trans. Wireless Communication, 2007.) are known. In case of performing MU-MIMO, it is able to transmit data to a plurality of user equipments as many as the maximum number of antennas of a base station at the same time. Yet, a method of simply loading data of a single user equipment on a single antenna may cause huge interference between data streams. Hence, a method of eliminating interference in advance to eliminate interference between data streams can be considered as the ZF and the BD.

FIG. 17 (*a*) shows an example of MU-MIMO in a single cell and FIG. 17 (*b*) shows an example of base station cooperative communication using multiple cells. A difference between FIG. 17 (*a*) and FIG. 17 (*b*) is to share data to be transmitted to a user equipment with each other between cells. Yet, except the difference, it may be able to perform base station cooperative communication by identically applying the precoding method used in MU-MIMO. By doing so, interference capable of being occurred among multiple cells can be eliminated in advance while transmission is performed via multiple antennas of the multiple cells.

FIG. 17 (*c*) shows an example of base station cooperative communication performed in a base station cluster in which an overlap is permitted. In this case, since data to be transmitted to a user equipment may be not shared with all base stations, such a method as ZF and BD may not be directly applied. A difference between a case of permitting overlap and a case of not permitting overlap is explained in more detail with reference to FIG. 18 in the following.

Figure 18:
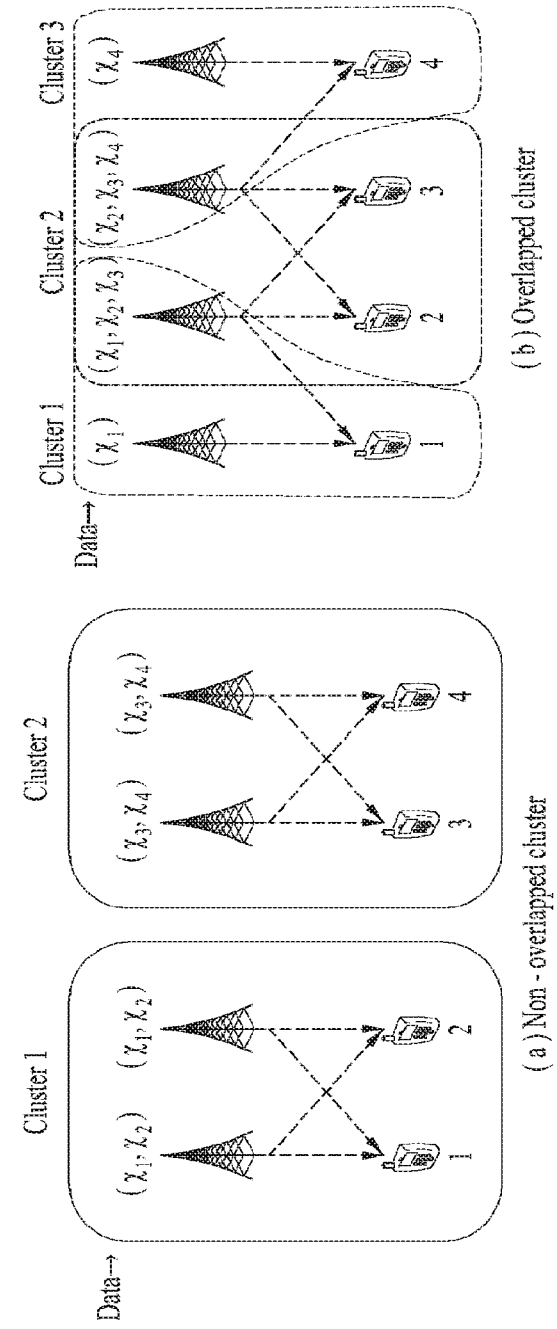
FIG. 18 shows an example of transmission using base station cooperative communication.

FIG. 18 shows an example of transmission using base station cooperative communication. FIG. 18 (*a*) shows an example of base station cooperative communication in case that overlap is not permitted. FIG. 18 (*b*) shows an example of base station cooperative communication in case that overlap is permitted. In the example of FIG. 18, assume a case that there exist 4 single antenna base stations and 4 single antenna user equipments.

Referring to FIG. 18 (*a*), a base station cluster can be formed without an overlap. For example, in case of not permitting an overlap, it may be able to form two channels of 2×2 MIMO channel. And, for example, in case of a cluster 1, a MIMO channel can be represented by $[y_1 \ y_2]^T = H_1 [x_1, x_2]^T$. In case of a cluster 2, a MIMO channel can be represented by $[y_3 \ y_4]^T = H_2 [x_3 \ x_4]^T$. Then, it is able to search for a ZF precoder in a manner of obtaining inverse matrixes of channel matrix $H_1$ and $H_2$ according to each cluster. In this case, in case of the cluster 1, the ZF precoder can be obtained by $H_1^*(H_1 H_1^*)^{-1}$. In case of the cluster 2, the ZF precoder can be obtained by $H_2^*(H_2 H_2^*)^{-1}$ for example. It is able to eliminate interference between base station cells belonging to an identical cluster using the obtained precoder.

On the contrary, referring to FIG. 18 (*b*), a base station cluster can be formed in a manner of being overlapped. In this case, it is difficult to differentiate a MIMO channel. As an example, 2×1 MIMO, 2×2 MIMO and 2×1 MIMO channel are formed according to each cluster and precoding can be performed for each of the channels via the ZF scheme. Yet, in this case, it may be difficult to control data transmitted by a second base station to a UE 2 and a UE 3 interfering a UE 1. In particular, the UE 1 may receive interference from a base station, which is formed by the UE 1 as a cluster. Hence, in order to solve the aforementioned problem, it is necessary to have a precoder of a new form.

Hence, the present invention proposes a precoding scheme including two characteristics described in the following to solve the problem.

A precoding scheme capable of supporting base station cooperative communication in which overlap is permitted A precoding scheme for maximizing transfer rate log(1+ SINR) as well as eliminating interference and increasing signal A system model and a variable are defined. Assume that there exist M number of base stations respectively equipped with $N_T$ number of antennas and K number of single antenna user equipments. Assume that a base station cluster is individually determined in a manner of being appropriate for each user equipment and a base station cluster of a user equipment k is represented as a set $C_k$. Assume that a set of scheduled user equipments is determined in advance and the set is represented as S. Assume that all data transmission to a user equipment are always performed by cluster base stations via base station cooperative communication. A channel between a user equipment k and a base station m is represented by $H_{km}$ corresponding to 1×$N_T$ vector. Assume that the base station is perfectly aware of information on the channel via feedback. When the base station m is one of cluster base stations of the user equipment k∈S, assume that a precoding vector of a data stream transmitted to the user equipment k by the base station m corresponds to $N_T \times 1$ $v_{mk}$ and transmit power corresponds to $P_{mk}$. Then, SINR can be measured in the user equipment k like Equation 9 in the following.

$$SINR_k = \frac{\left|\sum_{m \in M_k} H_{km} v_{mk} \sqrt{P_{mk}}\right|^2}{\sum_{\substack{j \neq k \\ j \in S}} \left|\sum_{m' \in M_j} H_{km'} v_{m'j} \sqrt{P_{m'j}}\right|^2 + \sigma^2}$$ [Equation 9]

In Equation 9, $\sigma^2$ indicate noise. And, a weighted sum-rate can be given as Equation 10 in the following.

[Equation 10]

$$\max_V \sum_k w_k \log_2(1 + SINR_k(V)) \quad (10\text{-}1)$$

$$\text{s.t. } \|v_{mk}\|^2 \leq 1, \forall m \in M, k \in S \cap K_m \quad (10\text{-}2)$$

An object of the present invention is to find out a precoder for maximizing a weighted sum-rate of Equation 10. A constraint of Equation 10 is that a size of a precoder is smaller than 1 (refer to Equation 10-2). Since a problem of Equation 10 corresponds to a non-convex optimization problem, it is known as it is difficult to simply find out an optimal solution via such a scheme as a gradient algorithm. Hence, the present invention proposes to find out a solution satisfying a KKT (Karush-Kuhn-Tucker) condition as a suboptimal solution. Although the solution satisfying the KKT condition secures an optimal solution for a convex optimization problem, the solution satisfying the KKT condition becomes a necessary condition of an optimal solution for the non-convex optimization problem.

First of all, a channel and a precoder are redefined in a manner of combining the channel and the precoder with each other in a cluster level before a Lagrangian function is induced. A virtual channel $\overline{H}_{kj}$ heading to a user equipment k from a base station belonging to a cluster formed by a user equipment j is defined as $\overline{H}_{kj}=[H_{km}\sqrt{P_{mj}}, m \in M_j]$. A precoder $\overline{v}_j$ to the user equipment j in the cluster formed by the user equipment j is defined as $\overline{v}_j=[v_{jm}^T, m \in M_j]^T$. Then, as shown in Equation 11 in the following, it is able to induce the Lagrangian function.

$$L(V, \lambda) = \sum_{k \in K} w_K \log_2 \left( \frac{\sum_{j \in S} |\overline{H}_{kj}\overline{v}_j|^2 + \sigma^2}{\sum_{\substack{j \neq k \\ j \in S}} |\overline{H}_{kj}\overline{v}_j|^2 + \sigma^2} \right) + \sum_k \lambda_k(1 - \|\overline{v}_j\|^2)$$ [Equation 11]

In Equation 11, $\lambda_k$ corresponds to a dual variable for a constraint of the weighted sum-rate problem of Equation 10. As shown in Table 3 in the following, 3 KKT conditions can be deducted from Equation 10 and Equation 11.

TABLE 3

| Condition 1. Complementary slackness |
|---|
| $\lambda_k(1 - \|\overline{v}_k\|^2) = 0, \forall k \in S$ |
| Condition 2. Constraints |
| $\lambda_k \geq 0, \|\overline{v}_k\|^2 \leq 1, \forall k \in S$ |
| Condition 3. Stationary ($\nabla_V L(V^{opt}, \lambda^{opt}) = 0$) |
| $(B_k + \lambda_k \ln 2 \, I)\overline{v}_k = A_k \overline{v}_k, \forall k \in S$ |
| where $A_k = w_{k,A}(\overline{H}_{kk}^* \overline{H}_{kk})$, $w_{k,A} = \dfrac{w_k}{\sum_{j \neq k, j \in S} |\overline{H}_{kj}\overline{v}_j|^2 + \sigma^2}$ |
| $B_k = \sum_{j \neq k, j \in S} w_{j,B}(\overline{H}_{jk}^* \overline{H}_{jk})$, $w_{j,B} = \dfrac{w_j SINR_j}{\sum_{i \in S} |\overline{H}_{kj}\overline{v}_j|^2 + \sigma^2}$ |

If v and λ satisfying three conditions of Table 3 are found, it might say a precoding vector at that time satisfies the KKT condition. In Table 3, a third condition operates based on two matrixes $A_k$ and $B_k$. Each of the matrixes is explained. The matrix $A_k$ is configured based on a channel heading to a user equipment k from cluster base stations of the user equipment k and reflects a signal component. The matrix $B_k$ is configured based on a channel heading to other user equipments except the user equipment k and reflects an interference component. Hence, a precoder satisfying the three conditions not only reduces strength of a signal of the precoder but also increases strength of interference heading to others. In particular, the precoder increases a transfer rate in a manner of keeping an appropriate balance. The present invention proposes an algorithm for finding out the precoder satisfying the three conditions of Table 3 in a manner of applying ROI (Rayleigh quotient iteration).

FIG. 19 shows an example of a method of finding out a precoder according to the present invention. In the step 7 of FIG. 19, "+" sign next to a square bracket corresponds to calculation for making a value in the square bracket to be equal to or greater than 0. For example, in case of [a]⁺, if a is equal to or greater than 0, a result of calculation corresponds to a. If the a is less than 0, a result of calculation corresponds to 0.

Referring to FIG. 19, steps 5, 6 and 7 can be intuitively interpreted as follows in relation to algorithm convergence. The steps 5 and 6 correspond to steps for finding out $\overline{v}_k$. It is able to make the $\overline{v}_k$ have a value in a direction of reducing a size of $\|(A_k-B_k)\overline{v}_k - \lambda_k \overline{v}_k\|$ for $\lambda_k$. And, the step 7 corresponds to a step for determining the $\lambda_k$ and corresponds to a modification of the ROI (Rayleigh quotient equation). It may be able to find out an optimal value capable of minimizing a value of the $\|(A_k-B_k)\overline{v}_k - \lambda_k \overline{v}_k\|$ for the $\lambda_k$ given by the step 7. It may be able to converge into a point satisfying the third condition of the KKT conditions in a manner of iteratively finding out the two variables $\overline{v}_k$ and $\overline{\lambda}_k$. It is able to converge into the point satisfying the KKT condition through an algorithm of FIG. 19. Since the algorithm of FIG. 19 has a cubically convergence rate similar to the ROI (Rayleigh quotient equation), a convergence rate of the algorithm is very fast.

If $\lambda_k$ value corresponds to 0 after all iterations are performed in the step 8 of FIG. 19, this is an exceptional situation. In this case, in order to satisfy the KKT condition, a precoder is set to 0 (or a zero vector). This sort of situation may occur when a value of $B_k$ matrix is considerably bigger than a value of $A_k$ matrix in general. In particular, the aforementioned situation may occur when strength of interference interfering a surrounding user equipment is too big in case that a signal is transmitted to a user equipment k in a current channel status. If the precoder is set to 0 (or a zero vector), it indicates that a signal is not transmitted to the user equipment k.

FIG. 20 shows an example of comparing performance of a precoder according to the present invention and performance of a different precoding scheme with each other. A result of FIG. 20 is induced from simulation in a manner of assuming a situation in which 20 base stations and a user equipment are distributed. Each base station includes 4 antennas and uses transmit power of 43 dBm and a frequency band of 5 MHz. Assume that a path loss of a channel follows a formula of $128.1+37.6 \times \log_{10}(d)$, d corresponds to a distance in km unit, and shadowing of the channel has a dispersion of 8 dB. Assume that identical environment is applied to all precoding schemes in a manner of fixing a base station cluster according to each user equipment and a scheduled user equipment in advance before precoding is performed. Assume that power budget owned by a base station is identically allocated to base station transmit power.

As a comparison target precoding scheme, it may use channel matching (CM) and zero-forcing (ZF). The CM corresponds to a method of conceptually increasing signal strength. If a MIMO channel H is given between a transmitting end and a receiving end, the CM method uses such a precoder as H/norm(H). The ZF corresponds to a method for reducing interference. The ZF uses such a precoder as $H^{-1}/\text{norm}(H^{-1})$.

Referring to FIG. 20, it shows a cumulative distribution function (CDF) of a signal when the precoding schemes are used. As shown in FIG. 20, a desired signal component is higher in an order of the CM, a proposed method and the ZF (refer to FIG. 20 (a)). It is able to check that an interference component is also higher in the order of the CM, the proposed method and the ZF (refer to FIG. 20 (b)). The proposed method according to the present invention operates in a direction of maximizing a sum-rate and maximizes log(1+SINR) as shown in FIG. 20 (c) in consideration of both the signal component and the interference component without considering either the signal component or the interference component.

FIG. 21 shows an example for performance of a precoder in a situation that a network size is changing. If the network size changes, the extent of inter-cell interference and signal strength may change. The network size is controlled to reproduce a new topology in a manner of scaling both a base station and a user equipment in the simulation environment of FIG. 20.

FIG. 21 (a) shows performance of a precoder according to a change of a network size in single cell transmission environment. As shown in FIG. 21 (a), as the network size is decreasing, it is able to check that performance of the ZF or performance of the proposed method according to the present invention is getting better. This is because signal strength is getting stronger as a distance between a user equipment and a base station is reduced. In particular, this can be regarded as a gain capable of being obtained by densely distributing cells. Yet, in case of the CM, since the CM does not consider interference at all, the aforementioned gain effect is disappeared. Hence, it is able to check that the proposed method according to the present invention has best performance in identical environment among the three schemes.

FIG. 21 (b) shows performance of a precoder according to a change of a network size in base station cooperative communication environment. In an example of FIG. 21 (b), a cluster size for base station cooperative communication is set to 2 and the aforementioned highest-N scheme is used as a clustering scheme. As shown in FIG. 21 (b), similar to a single cell transmission, as the network size is decreasing, it is able to check that performance of the ZF or performance of the proposed method according to the present invention is getting better. Yet, in case of the proposed method, performance of the proposed method is getting better compared to performance of the single cell transmission. On the contrary, in case of the ZF, it is able to check that performance of the ZF is getting worse compared to performance of the single cell transmission. There may exist two reasons for the aforementioned result. One is that the proposed method corresponds to precoding appropriate for a base station cooperative communication situation and another one is that it is failed to obtain maximum gain of the base station cooperative communication due to absence of proper power control. A method of overcoming the latter one is described in detail in the following description.

Power Allocation

Transmit power allocation has been treated as an important issue under various environments such as a single cell/multi-cell network, a single carrier/multi-carrier environment, a sensor network, an ad hoc network and the like in a radio resource management (RRM) field. In order to enhance performance of a whole network, a transmit power allocation scheme has been studied for various purposes including a method of allocating transmit power, a method of using minimum transmit power while network performance is maintained, a method of controlling transmit power to be more reduced by permitting data transmission delay and the like.

The present invention proposes a method of allocating transmit power to a user equipment to maximize a transfer rate of a whole of a network in base station cooperative communication environment in which an overlap is permitted between clusters. As a related study, there exist results for a method of allocating transmit power according to each frequency in OFDM (orthogonal frequency division multiplexing). A core of the study is about more enhancing a transfer rate by allocating limitative transmit power to a frequency of which a channel status is good since channel status is different from each other according to each frequency and finding out the transmit power using water filling-based algorithm. For details, it may refer to D. P. Palomar and J. R. Fonollosa, "Practical algorithms for a family of waterfilling solutions," IEEE Signal Processing Letter, vol. 53, no. 2, pp. 686-695, February 2005 및 K. Son, S. Lee, Y. Yi, and S. Chong, "REFIM: A Practical Interference Management in Heterogeneous Wireless Access Networks," IEEE Journal on Selected Areas in Communications, 2011.

FIG. 22 shows an example of a water filling-based power allocation algorithm. For clarity of explanation, FIG. 22 is represented in a pseudo code form. In the step 4 of FIG. 22, "+" sign next to a square bracket corresponds to calculation for making a value in the square bracket to be equal to or greater than 0. For example, in case of $[a]^+$, if a is equal to or greater than 0, a result of calculation corresponds to a. If the a is less than 0, a result of calculation corresponds to 0.

Referring to FIG. 22, according to each subcarrier, $tax_n$ and $height_n$ indicate a value related to the extent of interference interfering a different cell in case of sending transmit power to a corresponding frequency and a value related to a channel status of transmitting a desired signal to a reception user equipment, respectively. As interference is getting bigger, a value of the tax$_n$ is getting bigger. A channel status to a reception user equipment is getting better, a value of the height$_n$ is getting smaller. Hence, in the step 4, transmit power P$_n$ is determined by a higher value as transmit power to be transmitted to a corresponding frequency gives less interference to surrounding and the channel status to the reception user equipment is better. μ indicates a water level and makes a sum of transmit power currently intended to be used on all frequencies to be maintained as smaller than capacity (or power budget). If the sum of the transmit power exceeds the capacity, a value of the μ increases. Hence, overall transmit power used on all frequencies is reduced in the step 4. Hence, if the tax$_n$ and the height$_n$ are determined according to each base station, the algorithm configured to allocate transmit power shown in the example of FIG. 22 can be independently performed.

The method shown in the example of FIG. 22 is mainly used as a method of allocating transmit power to enhance a transfer rate of a whole of a network in OFDM system. The method can be identically extended to OFDM+MIMO system, in particular, up to a SU-MIMO system or a MU-MIMO system using single cell transmission only. If the method is extended, since transmit power is allocated using not only each subcarrier axis but also multiple antennas, a stream axis transmitting at the same time is further generated. Hence, if it is considered to use two axes only, the method of FIG. 22 can be used as it is, although the method is extended.

Yet, in case of base station cooperative communication, it is difficult to extend the method of FIG. 22 as it is. This is because, in case of an OFDM system or an OFDM+MIMO system, although a single data stream transmitted to a user equipment uses transmit power of a single base station only, a single data stream uses transmit power of one or more base stations in case of the base station cooperative communication. Hence, if transmit power distribution is performed according to a base station, a problem of modifying a precoding result may occur in the base station cooperative communication. Hence, it is necessary to have a transmit power control in a cluster level for the base station cooperative communication. Hence, the present invention proposes a method of allocating transmit power in a cluster level.

A system model and a variable are defined. Assume that there exist M number of base stations respectively equipped with N$_T$ number of antennas and K number of single antenna user equipments. Assume that a base station cluster is individually determined in a manner of being appropriate for each user equipment and a base station cluster of a user equipment k is represented as a set M$_k$. Assume that a set of scheduled user equipments is determined in advance and the set is represented as S. Assume that all data transmission to a user equipment are always performed by cluster base stations via base station cooperative communication. A channel between the user equipment k and a base station m is represented by H$_{km}$ corresponding to 1×N$_T$ vector. Assume that the base station is perfectly aware of information on the channel via feedback. When the base station m is one of cluster base stations of the user equipment k∈S, assume that a precoding vector of a data stream transmitted to the user equipment k by the base station m corresponds to N$_T$×1 v$_{mk}$ and transmit power corresponds to P$_{mk}$. Then, SINR can be measured in the user equipment k like Equation 12 in the following.

$$SINR_k = \frac{\left|\sum_{m \in M_k} H_{km} v_{mk} \sqrt{P_{mk}}\right|^2}{\sum_{\substack{j \neq k \\ j \in S}} \left|\sum_{m' \in M_j} H_{km'} v_{m'j} \sqrt{P_{m'j}}\right|^2 + \sigma^2} \quad \text{[Equation 12]}$$

In Equation 12, σ² indicate noise. And, a weighted sum-rate can be given as Equation 13 in the following.

[Equation 13]

$$\max_P \sum_k w_k \log_2(1 + SINR_k(P)) \quad (13\text{-}1)$$

$$\text{s.t.} \sum_{k \in K_m \cap S} \|v_{mk}\|^2 P_{mk} \leq \overline{P}_m, \forall m \in M \quad (13\text{-}2)$$

An object of the present invention is to realize power allocation for maximizing a weighted sum-rate of Equation 13. In Equation 13, $\overline{P}_m$ corresponds to transmit power capacity of the base station m and a constraint of Equation 13-2 is that power less than the $\overline{P}_m$ transmit power capacity is used according to each base station. A problem of Equation 13 and the problem of Equation 10 can be identically solved. In particular, since the problem of Equation 13 corresponds to a non-convex optimization problem, it is known as it is difficult to simply find out an optimal solution via such a scheme as a gradient algorithm. Hence, the present invention proposes to find out a solution satisfying a KKT (Karush-Kuhn-Tucker) condition as a suboptimal solution.

First of all, a channel is redefined in a manner of combining channels with each other in a cluster level before a Lagrangian function is induced. A virtual channel $\overline{H}_{kj}$ heading to a user equipment j from a base station belonging to a cluster formed by a user equipment k is defined as $\overline{H}_{kj}=[H_{km}\sqrt{P_{mj}}, m \in M_j]$ and a virtual channel g$_{kj}$ heading to the user equipment j from a cluster formed by the user equipment j is defined as $g_{kj}=|\Sigma_{m \in M_k} H_{jm} v_{mk}|^2$. And, transmit power is controlled in a cluster level instead of a base station level. For example, each transmit power is identically controlled in a cluster like P$_{mk}$=P$_k$, ∀$_m$∈M$_k$, ∀k∈S Then, as shown in Equation 14 in the following, it is able to induce the Lagrangian function.

$$L(P, \mu) = \sum_{k \in K} w_K \log_2 \left( \frac{\sum_{j \in S} g_{jk} P_j + \sigma^2}{\sum_{\substack{j \neq k \\ j \in S}} g_{jk} P_j + \sigma^2} \right) + \sum_m \mu_m \left( \overline{P}_m - \sum_{k \in K_m \cap S} \|v_{mk}\|^2 P_k \right) \quad \text{[Equation 14]}$$

In Equation 14, μ$_m$ corresponds to a dual variable for satisfying a constraint of the weighted sum-rate problem of Equation 13. As shown in Table 4 in the following, 3 KKT conditions can be deducted from Equation 13 and Equation 14.

TABLE 4

Condition 1. Complementary slackness $$\mu_m\left(\bar{P}_m - \sum_{k \in K_m \cap S} \|v_{mk}\|^2 P_k\right) = 0, \forall k \in S$$

Condition 2. Constraints $$\mu_m \geq 0, \forall m \in M$$

$$\sum_{k \in K_m \cap S} \|v_{mk}\|^2 P_k \leq \bar{P}_m, \forall m \in M$$

Condition 3. Stationary ($\nabla_P L(P^{opt}, \mu^{opt}) = 0$)

$$\sum_{j \neq k, j \in S} \tilde{w}_j g_{kj} + \sum_{m \in M_k} \|v_{mk}\|^2 \mu_m \ln 2 = \frac{w_k}{g_{kk} P_k + I_k} g_{kk}, \forall k \in S$$

where $\tilde{w}_j = \frac{w_j \text{SINR}_j}{\sum_{i \in S} g_{ik} P_i + \sigma^2}, I_k = \sum_{i \neq k, i \in S} g_{ik} P_i + \sigma^2$ Among the three conditions of Table 4, a third formula is summarized for Pk as Equation 15 in the following. In Equation 15, "+" sign next to a square bracket corresponds to calculation for making a value in the square bracket to be equal to or greater than 0. For example, in case of $[a]^+$, if a is equal to or greater than 0, a result of calculation corresponds to a. If the a is less than 0, a result of calculation corresponds to 0.

$$P_k = \left[\frac{w_k}{\sum_{j \neq k, j \in S} \tilde{w}_j g_{kj} + \sum_{m \in M_k} \|v_{mk}\|^2 \mu_m \ln 2} - \frac{I_k}{g_{kk}}\right]^+, \quad \text{[Equation 15]}$$

$\forall k \in S$

In Equation 15, $P_k$ value is determined by 3 terms including $\text{tax}_k = \sum_{j \neq k, j \in S} \tilde{w}_j g_{kj}, \sum_{m \in M_k} \|v_{mk}\|^2 \mu_m \ln 2$ and $$\text{height}_k = \frac{I_k}{g_{kk}}.$$

The $\text{tax}_k$ indicates influence of transmit power transmitted to a user equipment k interfering other user equipments. As a value of the $\text{tax}_k$ is getting bigger, transmit power allocated to the $P_k$ is getting smaller in Equation 15. On the contrary, as the value of the $\text{tax}_k$ is getting smaller, the transmit power is getting bigger. Hence, if the extent of interference giving interference to surrounding is less, it is able to control higher transmit power to be used. The $\text{height}_k$ indicates a channel status heading to the user equipment k instead of the interference interfering surrounding user equipments. As the channel status is better, the $\text{height}_k$ has a smaller value. Hence, according to Equation 15, as the channel status is better, it may have a higher $P_k$ value. A term for $\mu_m$ corresponds to a variable for checking whether or not transmit power used according to each base station exceeds capacity. If the transmit power exceeds the transmit power capacity, it may be able to control to use less transmit power according to the Equation 15 in a manner of increasing the value of the $\text{height}_k$. If the transmit power is smaller than the transmit power capacity, it may be able to control to use more transmit power according to the Equation 15 in a manner of decreasing the value of the $\text{height}_k$. Since the $P_k$ value is a monotonic function for the $\mu_m$, it may be able to find out a point satisfying three conditions of Table 4 in a form of bisection water filling method. The present invention proposes a transmit power allocation method according to the form of bisection water filling method.

FIG. 23 shows an example of a power allocation method according to the present invention. For clarity of explanation, FIG. 23 is represented in a pseudo code form. In the step 4 of FIG. 23, "+" sign next to a square bracket corresponds to calculation for making a value in the square bracket to be equal to or greater than 0. For example, in case of $[a]^+$, if a is equal to or greater than 0, a result of calculation corresponds to a. If the a is less than 0, a result of calculation corresponds to 0.

Specifically, referring to FIG. 23, in the step 1, $\text{tax}_k$ and $\text{height}_k$ are generated for a user equipment k belonging to a set S of user equipments. In the step 2, a variable $\mu_m$ is set to $\mu_{max}/2$ for a base station m and a variable am and bm are set to 0 and $\mu_{max}$, respectively. In the steps 3 to 8, after precoding is performed for all user equipments included in the set S of user equipments, the steps 4 to 7 are repeated until a difference between a sum $\sum_{k \in k_m \cap S} \|v_{mk}\|^2 P_k$ of transmit power $P_k$ and transmit power capacity $\bar{P}_m$ of the base station m is equal to or less than a prescribed level (δ) or a sum of a dual variable $\mu_m$ for all base station m is equal to or less than the prescribed level (δ).

The method of FIG. 23 is different from the method of FIG. 22 in that transmit power of a data stream transmitted to a user equipment is determined in consideration of all dual variables of base stations belonging to a cluster of a user equipment. By doing so, it is able to prevent transmit power of each base station from being greater than transmit power capacity and may be able to prevent a problem of modifying a precoder from being occurred in a manner of controlling transmit power of a data stream transmitted to a user equipment from a base station cluster with a same value.

FIG. 24 and FIG. 25 show an example of comparing performance of a power allocation method according to the present invention and performance of a different power allocation method with each other. A result of FIG. 24 and a result of FIG. 25 are deducted via simulation in a manner of assuming simulation environment identical to the simulation environment of FIG. 20. A base station cluster according to each user equipment, a scheduled user equipment and a precoder are fixed in advance before power allocation is performed and they are identically applied to all methods. In FIG. 24 and FIG. 25, "Equal power" indicates a method of identically allocating power budget to every data stream transmitted by a base station at the same time. "Proportional power" indicates a method of allocating power budget in proportion to a channel gain. "Cell-level WF" indicates a water filling method (refer to FIG. 22) performed according to a base station. "Cluster-level WF" indicates a water filling method (refer to FIG. 23) performed according to a cluster in accordance with the present invention. FIG. 24 shows a result to which a zero-forcing precoder is applied and FIG. 25 shows a result to which a precoder according to the present invention is applied.

Referring to FIG. 24 (a), in case of single cell transmission, it is able to check that performance of the proposed method is enhanced compared to the equal power allocation or the proportional power allocation. Similarly, referring to FIG. 25 (a), it is able to check that the performance of the proposed method is enhanced. Hence, it is able to see that the performance of the proposed method is excellent irrespective of a precoding scheme.

Yet, referring to FIG. 24 (*b*), in case of ZF-based base station cooperative communication, it shows that the performance of the proposed method is inferior to performance of the cell-level water filling method. Yet, as mentioned in the foregoing description, since a precoder of a ZF scheme is not appropriate for the base station cooperative communication, it is meaningless. According to the proposed method of the present invention, since transmit power control according to a base station impacts on a precoder of the base station cooperative communication, it is able to optimize transmit power allocation while performance degradation is prevented.

Referring to FIG. 25 (*b*), a precoder scheme according to the present invention is appropriate for the base station cooperative communication. Hence, when the precoder scheme according to the present invention is applied, if a cell-level water filling method is used, performance may be deteriorated compared to performance of an equal power allocation method. Yet, if a cluster-level water filling method according to the present invention is used, it may be able to enhance performance. When FIG. 24 (*b*) and FIG. 25 (*b*) are compared with each other, if a precoder and power allocation of the proposed method are used, it is able to know that there exists maximum 20% of performance gain compared to a case of using a different combination.

Figures 26, 27:
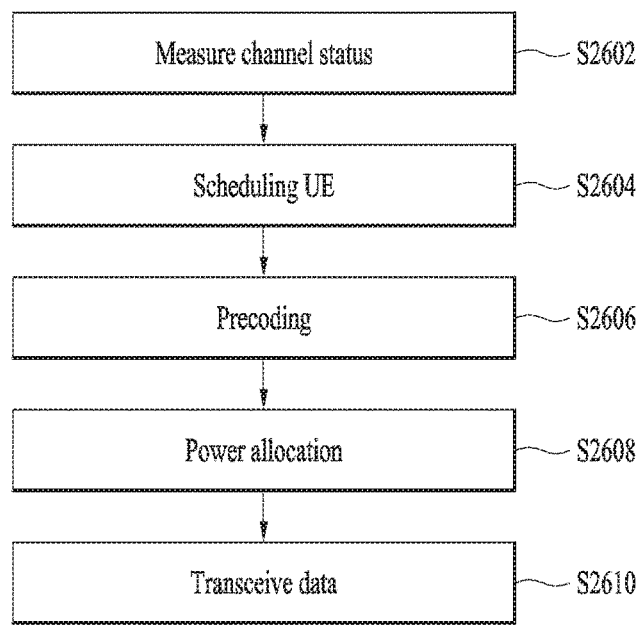
FIG. 26 shows an example of a flowchart for a method of performing communication in a cloud RAN system according to the present invention.
FIG. 27 shows an example of a radio resource management (RRM) method for a cloud RAN system.

FIG. 26 shows an example of a flowchart for a method of performing communication in a cloud RAN system according to the present invention. Assume that a virtual cell is formed before the method of FIG. 26 is performed. As an example, the virtual cell can be formed according to the method shown in the example of FIG. 8. And, as an example, the method of FIG. 26 can be performed in a cloud server in every time slot.

In the step S2602, each user equipment measures a channel status with each base station and may be able to feedback the measured channel status to a cloud RAN via a radio interface between a user equipment and a virtual cell. As an example, the radio interface can generate a cloud server via base station cluster information which is received through the method of FIG. 8.

In the step S2604, a network (e.g., a cloud server) can select a user equipment to perform data transmission and reception. In a cloud RAN system, since each user equipment communicates with the network via a virtual cell, selecting a user equipment may correspond to a concept identical to selecting a virtual cell for a user equipment. as an example, selecting a target user equipment can be performed via a group-based greedy scheduling method according to the present invention (refer to FIG. 13).

In the step S2606, the network (e.g., a cloud server) can perform precoding on a data to be transmitted. A precoder can be obtained via the method (refer to FIG. 19) according to the present invention.

In the step S2608, the network ((e.g., a cloud server) can perform power allocation to transmit a precoded data. The power allocation can be performed via a cluster-level water filling-based power allocation method (refer to FIG. 23) according to the present invention. Meanwhile, the step S2608 and the step S2606 can be performed in the same step or can be performed in an inverse order.

In the step S2610, the network ((e.g., a cloud server) can deliver information on scheduling, a precoder and power allocation to base stations configured to form the virtual cell for the selected user equipment and each of the base stations can transceive data with a user equipment based on the information.

FIG. 27 shows an example of a radio resource management (RRM) method for a cloud RAN system. Specifically, FIG. 27 shows an example for a method of managing a UE-centered virtual cell in a cloud RAN system via base station clustering, user equipment clustering, precoding and a power allocation method proposed by the present invention. For better understanding, the method is shown in a form of a pseudo code. As shown in the example of FIG. 27, four control elements (base station clustering, user equipment clustering, precoding and power allocation) proposed by the present invention can be managed in a manner of being integrated with each other.

Figure 28:
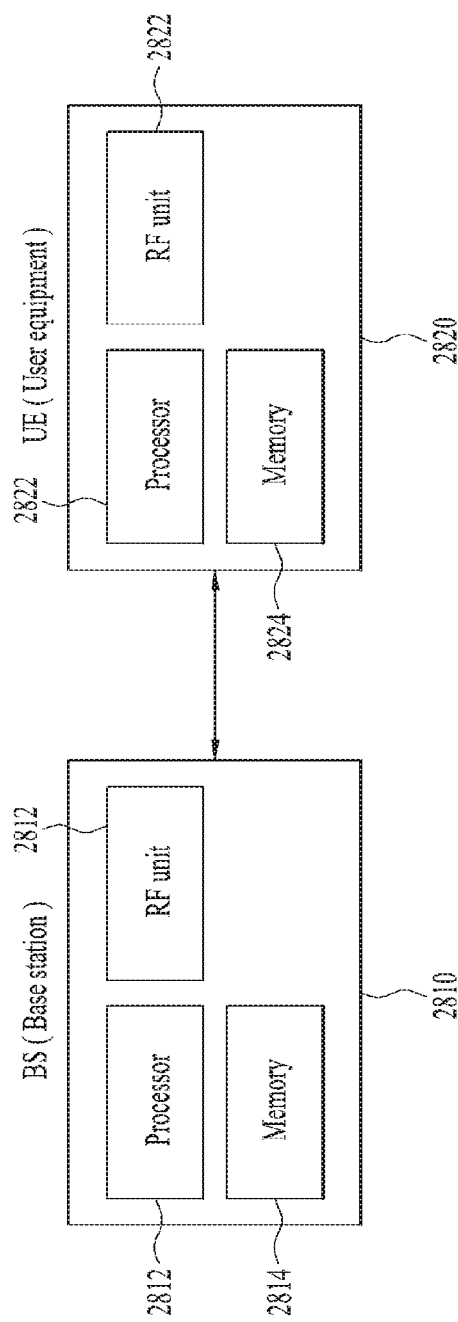
FIG. 28 is a diagram illustrating a BS 110 and a UE 120 to which the present invention is applicable.

FIG. 28 is a diagram illustrating a BS 110 and a UE 120 to which the present invention is applicable.

Referring to FIG. 28, a wireless communication system includes the BS 2810 and the UE 2820. When the wireless communication system includes a relay, the BS 2810 or the UE 2820 can be replaced with the relay.

The BS 2810 includes a processor 2812, a memory 2814, and a radio frequency (RF) unit 2816. The processor 2812 may be configured to embody the procedures and/or methods proposed by the present invention. The memory 2814 is connected to the processor 2812 and stores various pieces of information associated with an operation of the processor 2812. The RF unit 2816 is connected to the processor 2812 and transmits/receives a radio signal. The UE 2820 includes a process 2822, a memory 2824, and an RF unit 2826. The processor 122 may be configured to embody the procedures and/or methods proposed by the present invention. The memory 2824 is connected to the processor 2822 and stores various pieces of information associated with an operation of the processor 2822. The RF unit 2826 is connected to the processor 2822 and transmits/receives a radio signal.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The software module for instructions and/or data implementing the embodiments of the present invention may include scripts, batch files, or other executable files. The software modules may be stored on a machine-readable or computer-readable storage medium such as a disk drive. Storage devices used for storing software modules in accordance with an embodiment of the invention may be any type of disk including magnetic floppy disks, hard disks, optical discs, DVC, CD-ROM, microdrive, magneto-optical disk, ROM, RAM, EPROM, EEPROM, DRAM, VRAM, flash memory device, magnetic or optical card, nano system (including molecular memory IC), or any type of medium suitable for storing instructions and/or data. A storage device used for storing firmware or hardware modules in accordance with an embodiment of the invention may also include a semiconductor-based memory, which may be permanently, removably, or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

In case that the software module implementing an embodiment of the present invention is stored in a computer-readable recording medium, the software module may be implemented by codes or instructions that enables a server or computer to perform the method according to the present invention when the codes or instructions are executed by a processor (e.g., a microprocessor).

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), etc.

What is claimed is:

1. A method for performing a communication with a user equipment by a network in a wireless communication system, the method comprising:

receiving, by the network from the user equipment, information about a base station cluster, wherein the base station cluster comprises a plurality of base stations and is determined at the user equipment according to the following equation:

$$M_k = \left\{ m \in M \mid S_{mk} \geq \frac{w_{mk}}{x_k}(1 + y_m) \right\},$$

where $M_k$ indicates the base station cluster, $S_{mk}$ indicates a strength of a signal received at a user equipment k from the plurality of base stations of the base station cluster, $w_{mk}$ indicates a value of a sum of signal strengths received at the user equipment k from the plurality of base stations, and that is divided by a resource allocation gain, $x_k$, from a base station m of the plurality of base stations to the user equipment k, and $y_m$ indicates load information of the base station m;

generating, by the network, a radio interface between the user equipment and a virtual cell based on information about the base station cluster, wherein the virtual cell is formed using the plurality of base stations;

grouping, by the network, a plurality of user equipments into a plurality of groups to satisfy a specific condition;

selecting, by the network, the user equipment from a group of the plurality of groups for scheduling using a group-based greedy algorithm, wherein checking whether or not a total number of antennas of a base station corresponding to each group is equal to or greater than a number of user equipments selected from each group is skipped in the group-based greedy algorithm; and performing, by the network, data transmission and reception with the user equipment.

2. The method of claim 1, wherein the specific condition comprises a condition that each group contains one or more corresponding base stations and each base station corresponds to a single group only, and a condition that each user equipment belongs to a single group only and the group contains a single base station among cluster base stations of the corresponding user equipment.

3. The method of claim 1, wherein the grouping sequentially maps each user equipment from a group having lowest load.

4. The method of claim 1, wherein the group-based greedy algorithm includes for each group and each user equipment belonging to a corresponding group:

comparing performance expected when a corresponding user equipment is included in at least one or more user equipments to be selected with performance expected when the corresponding user equipment is not included in the at least one or more user equipments, and including the corresponding user equipment in the at least one or more user equipments when the performance expected when the corresponding user equipment is included in the at least one or more user equipments is better than the performance expected when the corresponding user equipment is not included in the at least one or more user equipments.

5. The method of claim 4, wherein the comparing and the including are repeated in the group-based greedy algorithm, until a number of the at least one or more user equipments becomes equal to or greater than the total number of antennas of a base station corresponding to a group or no performance enhancement is expected for the at least one or more user equipments.

6. A communication device configured to perform a communication with a user equipment in a wireless communication system, the communication device comprising:
a radio frequency (RF) unit; and
a processor operatively connected to the RF unit and configured to:
receive, from the user equipment, information about a base station cluster, wherein the base station cluster comprises a plurality of base stations and is determined at the user equipment according to the following equation:

$$M_k = \left\{ m \in M \mid S_{mk} \geq \frac{w_{mk}}{x_k}(1 + y_m) \right\},$$

where $M_k$ indicates the base station cluster, $S_{mk}$ indicates a strength of a signal received at a user equipment k from the plurality of base stations of the base station cluster, $w_{mk}$ indicates a value of a sum of signal strengths received at the user equipment k from the plurality of base stations, and that is divided by a resource allocation gain, $x_k$, from a base station m of the plurality of base stations to the user equipment k, and $y_m$ indicates a value indicating load information of the base station m,
generate a radio interface between the user equipment and a virtual cell based on information about the base station cluster, wherein the virtual cell is formed using the plurality of base stations;
group a plurality of user equipments into a plurality of groups to satisfy a specific condition,
select the user equipment from a group of the plurality of the groups for scheduling using a group-based greedy algorithm,
wherein checking whether or not a total number of antennas of a base station corresponding to each group is equal to or greater than a number of user equipments selected from each group is skipped in the group-based greedy algorithm, and
perform data transmission and reception with the user equipment.

7. The communication device of claim 6, wherein the specific condition comprises a condition that each group contains one or more corresponding base stations and each base station corresponds to a single group only, and a condition that each user equipment belongs to a single group only and the group contains a single base station among cluster base stations of the corresponding user equipment.

8. The communication device of claim 6, wherein the grouping sequentially maps each user equipment from a group having lowest load.

9. The communication device of claim 6, wherein the group-based greedy algorithm includes for each group and each user equipment belonging to a corresponding group:
comparing performance expected when a corresponding user equipment is included in at least one or more user equipments to be selected with performance expected when the corresponding user equipment is not included in the at least one or more user equipments, and
including the corresponding user equipment in the at least one or more user equipments when the performance expected when the corresponding user equipment is included in the at least one or more user equipments is better than the performance expected when the corresponding user equipment is not included in the at least one or more user equipments.

10. The communication device of claim 9, wherein the comparing and the including are repeated in the group-based greedy algorithm, until a number of the at least one or more user equipments becomes equal to or greater than the total number of antennas of a base station corresponding to a group or no performance enhancement is expected for the at least one or more user equipments.

11. The method of claim 1, wherein the strength of the signal is obtained by measuring a strength of a reference signal.

12. The method of claim 11, wherein the reference signal is used for receiving the load information.

13. The method of claim 1, wherein the signal is periodically broadcasted.

14. The method of claim 1, wherein the load information indicates a load of a backhaul network in the wireless communication system.

15. The communication device of claim 6, wherein the strength of the signal is obtained by measuring a strength of a reference signal.

16. The communication device of claim 15, wherein the reference signal is used for receiving the load information.

17. The communication device of claim 6, wherein the signal is periodically broadcasted.

18. The communication device of claim 6, wherein the load information indicates a load of a backhaul network in the wireless communication system.

* * * * *